(12) United States Patent
Hakamada et al.

(10) Patent No.: US 9,703,252 B2
(45) Date of Patent: Jul. 11, 2017

(54) POWER SUPPLY CONTROLLING DEVICE, POWER SUPPLY DEVICE, IMAGE FORMING APPARATUS, AND POWER SUPPLY CONTROLLING METHOD

(71) Applicants: Yuuto Hakamada, Kanagawa (JP); Masahide Nakaya, Kanagawa (JP); Jyunya Sakuraba, Kanagawa (JP)

(72) Inventors: Yuuto Hakamada, Kanagawa (JP); Masahide Nakaya, Kanagawa (JP); Jyunya Sakuraba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/213,851

(22) Filed: Jul. 19, 2016

(65) Prior Publication Data

US 2017/0023904 A1    Jan. 26, 2017

(30) Foreign Application Priority Data

Jul. 24, 2015  (JP) .................................. 2015-147253
Apr. 19, 2016  (JP) .................................. 2016-083688

(51) Int. Cl.
G03G 15/00     (2006.01)
H02M 3/28      (2006.01)
(Continued)

(52) U.S. Cl.
CPC ......... *G03G 15/80* (2013.01); *G03G 15/1675* (2013.01); *H02M 3/28* (2013.01); *H02M 3/33569* (2013.01); *H02M 2001/0009* (2013.01)

(58) Field of Classification Search
CPC .......................... G03G 15/80; G03G 15/1675
(Continued)

(56) References Cited

U.S. PATENT DOCUMENTS 8,725,023 B2 *  5/2014  Inukai ................... G03G 15/80
                                                        399/88
9,465,348 B2 * 10/2016  Maekawa et al. ..... G03G 15/80
(Continued)

FOREIGN PATENT DOCUMENTS

JP    2000-339043    12/2000
JP    2013-037201     2/2013
JP    2014-209152    11/2014

*Primary Examiner* — William J Royer
(74) *Attorney, Agent, or Firm* — Oblon, McClelland, Maier & Neustadt, L.L.P.

(57) ABSTRACT

A power supply controlling device includes: a direct-current power supply configured to output a direct-current voltage; an alternating-current power supply configured to output one selected from between a superimposed voltage obtained by superimposing an alternating-current voltage onto the direct-current voltage and the direct-current voltage; a bypass capacitor configured to partially store therein an output from the alternating-current power supply and configured to, when the direct-current voltage is output from the direct-current power supply while no electric charge is stored therein, store therein a second direct current being a part of a first direct current output from the direct-current power supply in conjunction with the output of the direct-current voltage; and a power supply controlling unit configured to cause the direct-current power supply to control a level of the direct-current voltage based on a target value for the first direct current and a value indicating the second direct current.

15 Claims, 20 Drawing Sheets

(51) Int. Cl.
*H02M 3/335* (2006.01)
*G03G 15/16* (2006.01)
*H02M 1/00* (2006.01)

(58) Field of Classification Search
USPC .................................................. 399/88, 89
See application file for complete search history.

(56) References Cited

U.S. PATENT DOCUMENTS

| | | |
|---|---|---|
| 2012/0045237 A1 | 2/2012 | Aoki et al. |
| 2012/0213536 A1 | 8/2012 | Takeuchi |
| 2012/0230715 A1 | 9/2012 | Ogino et al. |
| 2012/0237271 A1 | 9/2012 | Sengoku et al. |
| 2012/0308250 A1 | 12/2012 | Shimizu et al. |
| 2012/0315058 A1 | 12/2012 | Shimizu et al. |
| 2012/0328315 A1 | 12/2012 | Takeuchi et al. |
| 2012/0328320 A1 | 12/2012 | Fujita et al. |
| 2012/0328321 A1 | 12/2012 | Takeuchi et al. |
| 2013/0004190 A1 | 1/2013 | Sengoku et al. |
| 2013/0011155 A1 | 1/2013 | Ogiyama et al. |
| 2013/0016989 A1 | 1/2013 | Fujita et al. |
| 2013/0094870 A1 | 4/2013 | Shimizu et al. |
| 2013/0136477 A1 | 5/2013 | Ogiyama et al. |
| 2013/0216281 A1 | 8/2013 | Suzuki et al. |
| 2014/0079421 A1 | 3/2014 | Takeuchi |
| 2014/0079422 A1 | 3/2014 | Suzuki |
| 2014/0265552 A1 | 9/2014 | Maekawa et al. |

\* cited by examiner

POWER SUPPLY CONTROLLING DEVICE, POWER SUPPLY DEVICE, IMAGE FORMING APPARATUS, AND POWER SUPPLY CONTROLLING METHOD

CROSS-REFERENCE TO RELATED APPLICATIONS

The present application claims priority under 35 U.S.C. §119 to Japanese Patent Application No. 2015-147253, filed Jul. 24, 2015 and Japanese Patent Application No. 2016-083688, filed Apr. 19, 2016. The contents of which are incorporated herein by reference in their entirety.

BACKGROUND OF THE INVENTION

1. Field of the Invention

The present disclosure is related to a power supply controlling device, a power supply device, an image forming apparatus, and a power supply controlling method.

2. Description of the Related Art

Electrophotographic image forming apparatuses are configured to form an image on a recording medium by forming an electrostatic latent image on an image bearer uniformly charged, forming a toner image by developing the formed electrostatic latent image with toner, and transferring and fixing the formed toner image onto the recording medium.

Further, a technique is also known by which an image forming apparatus such as that described above uses a power supply device in which a direct-current power supply and an alternating-current power supply are connected in series so that it is possible to switch between transferring the image onto the recording medium by applying a direct-current voltage from the power supply device to a transfer unit and transferring the image onto the recording medium by applying a superimposed voltage obtained by superimposing a direct-current voltage and an alternating-current voltage together from the power supply device to a transfer unit.

When the recording medium has projections and recesses, although toner is transferred to the recesses less easily than to the projections, it is possible to improve the toner transfer efficiency by transferring the toner while using a superimposed voltage obtained by superimposing an alternating-current voltage. Thus, by using the image forming apparatus described above, it is possible to improve the quality of the image, even if the image is formed onto the recording medium having projections and recesses.

However, it should be noted that, in the power supply device described above, due to an influence of a bypass capacitor used for preventing the output of the alternating-current power supply from being routed into the direct-current power supply, it takes a longer period of time for the direct-current voltage output by the direct-current power supply to rise than in situations where the direct-current power supply is used alone.

To cope with this situation, US Patent Application Publication No. 2014/0265552, for example, proposes a technique by which an output of a direct-current voltage is started by exercising constant voltage control, and subsequently, the output of the direct-current voltage is realized by switching the controlling method to constant current control, so that it is possible to shorten the charging period of the electric charge into a bypass capacitor and to shorten the rising period of the direct-current voltage.

According to the conventional technique, however, the start of the constant current control is delayed by an influence of a residual electric charge remaining after the controlling method is switched from the constant voltage control to the constant current control. Consequently, there may be some situations where the direct current output from the power supply device becomes too low before the constant current control is started, and it may thus become impossible to cause the direct-current voltage to rise within an expected period of time.

In view of the circumstances described above, there is a need to provide a power supply controlling device, a power supply device, an image forming apparatus, and a power supply controlling method with which it is possible to cause the direct-current voltage to rise within the expected period of time, while shortening the rising period of the direct-current voltage.

SUMMARY OF THE INVENTION

According to exemplary embodiments of the present invention, there is provided a power supply controlling device comprising: a direct-current power supply configured to output a direct-current voltage; an alternating-current power supply configured to output one selected from between a superimposed voltage obtained by superimposing an alternating-current voltage onto the direct-current voltage and the direct-current voltage; a bypass capacitor configured to partially store therein an output from the alternating-current power supply and configured to, when the direct-current voltage is output from the direct-current power supply while no electric charge is stored therein, store therein a second direct current being a part of a first direct current output from the direct-current power supply in conjunction with the output of the direct-current voltage; and a power supply controlling unit configured to cause the direct-current power supply to control a level of the direct-current voltage based on a target value for the first direct current and a value indicating the second direct current.

Exemplary embodiments of the present invention also provide an image forming apparatus comprising: the above-described power supply controlling device; and a transfer unit configured to transfer an image onto a recording medium based on an output from the alternating-current power supply.

Exemplary embodiments of the present invention also provide a power supply device comprising: a direct-current power supply configured to output a direct-current voltage; an alternating-current power supply configured to output one selected from between a superimposed voltage obtained by superimposing an alternating-current voltage onto the direct-current voltage and the direct-current voltage; a bypass capacitor configured to partially store therein an output from the alternating-current power supply and configured to, when the direct-current voltage is output from the direct-current power supply while no electric charge is stored therein, store therein a second direct current being a part of a first direct current output from the direct-current power supply in conjunction with the output of the direct-current voltage; and a power supply controlling unit configured to cause the direct-current power supply to control a level of the direct-current voltage based on a target value for the first direct current and a value indicating the second direct current.

Exemplary embodiments of the present invention also provide an image forming apparatus comprising: the above-described power supply device; and a transfer unit configured to transfer an image onto a recording medium based on an output from the alternating-current power supply.

Exemplary embodiments of the present invention also provide a power supply controlling method comprising: a first outputting to output a direct-current voltage; a second outputting to output one selected from between a superimposed voltage obtained by superimposing an alternating-current voltage onto the direct-current voltage and the direct-current voltage; and a controlling to have a level of the direct-current voltage controlled based on a target value for a first direct current that is output in conjunction with the output of the direct-current voltage and a value indicating a second direct current that is a part of the first direct current and is stored in a bypass capacitor.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
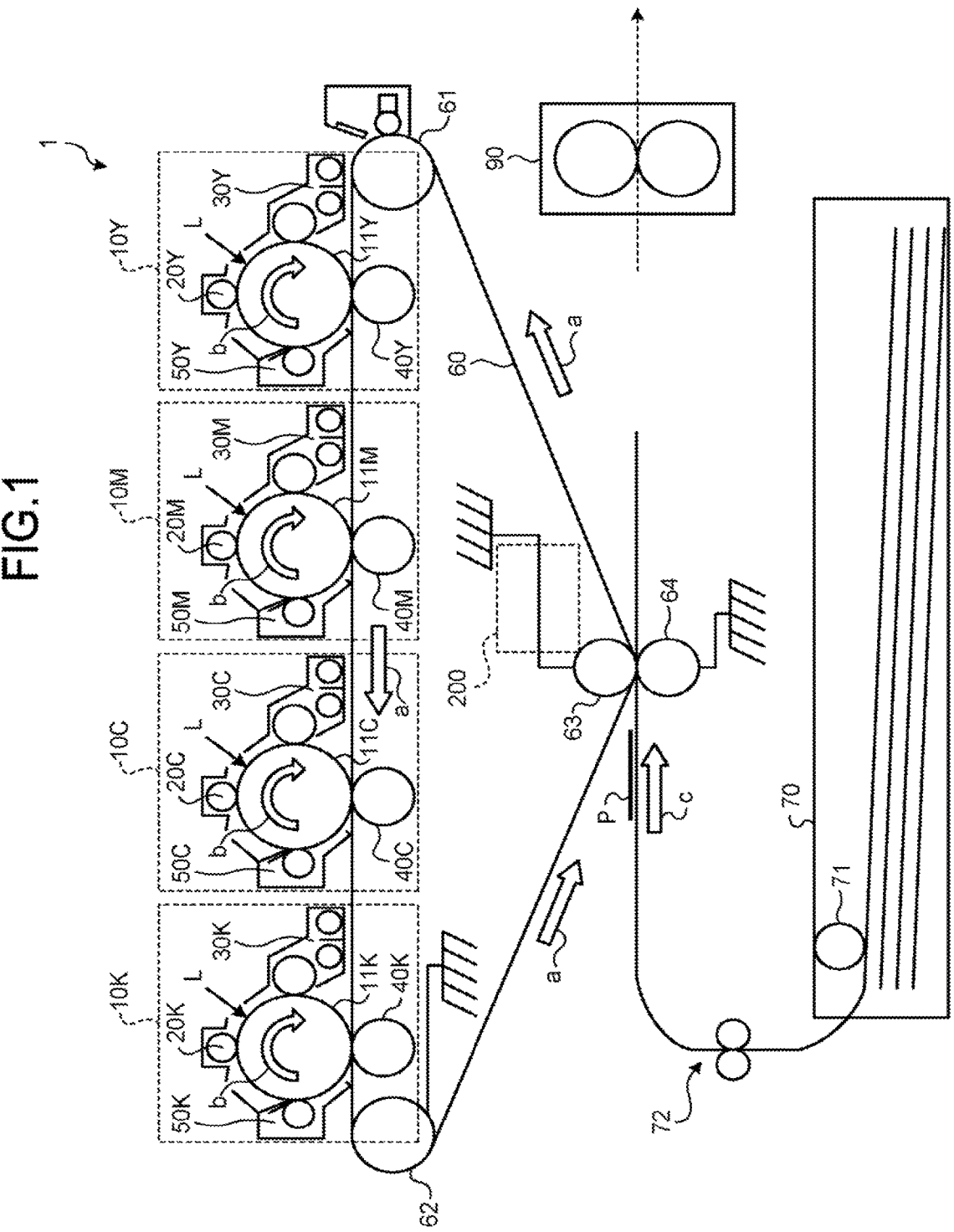
FIG. 1 is a mechanical configuration diagram illustrating an example of a printing apparatus according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of a power supply controlling device, a power supply device, an image forming apparatus, and a power supply controlling method of the present disclosure will be explained in detail below, with reference to the accompanying drawings. In an embodiment described below, an example will be explained in which an image forming apparatus of the present disclosure is applied to a color electrophotographic printing apparatus, more specifically, a printing apparatus configured to form an image by superimposing color component images in the four colors of yellow (Y), magenta (M), cyan (C), and black (K) on top of one another on a recording medium; however, possible embodiments are not limited to this example.

The image forming apparatus according to the present disclosure is applicable to any apparatus that electrophotographically forms an image regardless of whether the formed image is in color or monochrome and is applicable to, for example, an electrophotographic copying machine or an electrophotographic multifunction peripheral (MFP). In this situation, the term "multifunction peripheral" denotes an apparatus having at least two functions selected from among a printing function, a copying function, a scanner function, and a facsimile function.

FIG. 1 is a mechanical configuration diagram of an example of a printing apparatus 1 according to the present embodiment. As illustrated in FIG. 1, the printing apparatus 1 includes image forming units 10Y, 10M, 10C, and 10K, an intermediate transfer belt 60, supporting rollers 61 and 62, a secondary transfer unit opposing roller (a repulsive force roller) 63 (an example of the load and the transfer unit), a secondary transfer roller 64, a paper cassette 70, a paper feeding roller 71, a pair of conveyance rollers 72, a fixing device 90, and a secondary transfer power supply 200 (an example of the power supply device).

As illustrated in FIG. 1, the image forming units 10Y, 10M, 10C, and 10K are arranged along the intermediate transfer belt 60 in the order of the image forming unit 10Y, 10M, 10C, and 10K, from the upstream side of the moving direction (the direction of arrow a) of the intermediate transfer belt 60.

Figure 2:
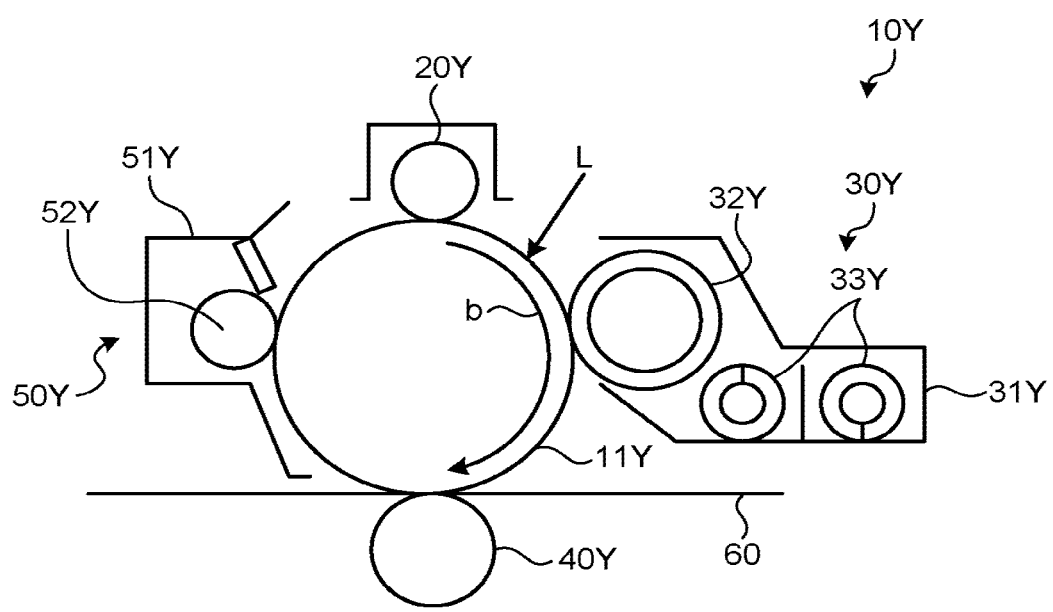
FIG. 2 is a mechanical configuration diagram illustrating an example of an image forming unit according to the present embodiment.

FIG. 2 is a mechanical configuration diagram illustrating an example of the image forming unit 10Y according to the present embodiment. As illustrated in FIG. 2, the image forming unit 10Y includes a photoconductor drum 11Y, a charging device 20Y, a developing device 30Y, a primary transfer roller 40Y, and a cleaning device 50Y. The image forming unit 10Y forms a yellow toner image (a color component image) on the photoconductor drum 11Y, by performing an image formation process (a charging step, an irradiating step, a developing step, a transfer step, and a cleaning step) on the photoconductor drum 11Y and further transfers the generated yellow toner image onto the intermediate transfer belt 60.

Each of the image forming units 10M, 10C, and 10K includes constituent elements that are the same as those included in the image forming unit 10Y. The image forming unit 10M forms a magenta toner image by performing the image formation process. The image forming unit 10C forms a cyan toner image by performing the image formation process. The image forming unit 10K forms a black toner image by performing the image formation process. Thus, in the following sections, the constituent elements of the image forming unit 10Y will be explained primarily. The constituent elements of the image forming units 10M, 10C, and 10K will simply be referred to by using the letters M, C, and K in place of the letter Y appended to the reference characters for the constituent elements of the image forming unit 10Y (see FIG. 1), so as to omit explanations thereof.

The photoconductor drum 11Y is an image bearer and is driven to rotate in the direction of arrow b. The photoconductor drum 11Y may be, for example, an organic photoconductor of which the outside diameter is 60 mm. Similarly, each of the photoconductor drums 11M, 11C, and 11K is also driven to rotate in the direction of arrow b.

In an example, the photoconductor drum 11K for black and the photoconductor drums 11Y, 11M, and 11C for color may be configured so as to be driven to rotate independently of each other. With this arrangement, it is possible to drive and rotate only the photoconductor drum 11K for black when a monochrome image is to be formed and to drive and rotate the photoconductor drums 11Y, 11M, 11C, and 11K at the same time when a color image is to be formed.

At first, in the charging step, the charging device 20Y electrically charges the surface of the photoconductor drum 11Y that is being driven to rotate. More specifically, the charging device 20Y applies a voltage obtained by superimposing an alternating-current voltage (hereinafter, "AC voltage") onto a direct-current voltage (hereinafter, "DC voltage"), to the charging roller, which is a conductive elastic body in the form of a roller, for example. As a result, the charging device 20Y generates a direct discharge between the charging roller and the photoconductor drum 11Y, so that the photoconductor drum 11Y is electrically charged with predetermined polarity, e.g., the negative polarity.

Subsequently, in the irradiating step, the irradiating device forms an electrostatic latent image on the surface of the photoconductor drum 11Y by irradiating the charged surface of the photoconductor drum 11Y with optically-modulated laser light L. As a result, such a part of the surface part of the photoconductor drum 11Y that was irradiated with the laser light L and of which the absolute value of the electric potential is lowered forms an electrostatic latent image (an image part). In contrast, such a part of the surface part of the photoconductor drum 11Y that was not irradiated with the laser light L and of which the absolute value of the electric potential is kept high forms a background part.

After that, at the developing step, the developing device 30Y forms the yellow toner image on the photoconductor drum 11Y by developing the electrostatic latent image formed on the photoconductor drum 11Y by using yellow toner.

The developing device 30Y includes a storing container 31Y, a developing sleeve 32Y stored in the storing container 31Y, and a screw member 33Y stored in the storing container 31Y. The storing container 31Y stores therein a two-component developing agent including the yellow toner and a carrier. The developing sleeve 32Y is a developing agent bearer and is arranged so as to oppose the photoconductor drum 11Y via an opening of the storing container 31Y. The screw member 33Y is a stirring member that conveys the developing agent while stirring the developing agent. The screw member 33Y is arranged on the developing-agent supply side which is the developing sleeve side and on the supply receiving side where the supply is received from a toner supply device. The screw member 33Y is rotatably supported by a bearing member in the storing container 31Y.

Subsequently, in the transfer step, the primary transfer roller 40Y transfers the yellow toner image formed on the photoconductor drum 11Y onto the intermediate transfer belt 60. In this situation, even after the toner image has been transferred, a small amount of untransferred toner remains on the photoconductor drum 11Y.

The primary transfer roller 40Y is, for example, an elastic roller including a conductive sponge layer. The primary transfer roller 40Y is arranged so as to be pressed against the photoconductor drum 11Y from the rear surface of the intermediate transfer belt 60. To the elastic roller, a bias on which constant current control is executed is applied as a primary transfer bias. The primary transfer roller 40Y is configured so that, for example, the exterior dimension is 16 mm, and the diameter of the core member is 10 mm, while the value of a resistance R of the sponge layer is approximately equal to $3E7\Omega$. The value of the resistance R of the sponge layer is calculated by using Ohm's Law (R=V/I) based on the electric current I that flows when a voltage V of 1,000 V is applied to the core member of the primary transfer roller 40Y, while a metal roller that is grounded and has an outside diameter of 30 mm is pressed thereon by a force of 10N.

Subsequently, in the cleaning step, the cleaning device 50Y wipes off the untransferred toner remaining on the photoconductor drum 11Y. The cleaning device 50Y includes a cleaning blade 51Y and a cleaning brush 52Y. The cleaning blade 51Y cleans the surface of the photoconductor drum 11Y while abutting against the photoconductor drum 11Y from the counter direction of the rotation direction of the photoconductor drum 11Y. The cleaning brush 52Y cleans the surface of the photoconductor drum 11Y while being in contact with the photoconductor drum 11Y and rotating in the direction opposite to the rotation direction of the photoconductor drum 11Y.

Returning to the description of FIG. 1, the intermediate transfer belt 60 is an endless belt that is spanned around a plurality of rollers such as the supporting rollers 61 and 62 and the secondary transfer unit opposing roller 63. When one of the supporting rollers 61 and 62 is driven to rotate, the intermediate transfer belt 60 endlessly moves in the direction of arrow a. Onto the intermediate transfer belt 60, the yellow toner image is at first transferred by the image forming unit 10Y, and subsequently, the magenta toner image is transferred by the image forming unit 10M, the cyan toner image is transferred by the image forming unit 10C, and the black toner image is transferred by the image forming unit 10K sequentially in a superimposed manner. As a result, on the intermediate transfer belt 60, a full-color toner image (a full-color image) is formed. After that, the intermediate transfer belt 60 conveys the formed full-color toner image to a position between the secondary transfer unit opposing roller 63 and the secondary transfer roller 64.

The intermediate transfer belt 60 is structured by using an endless carbon-dispersed polyimide resin member of which, for example, the thickness is in the range from 20 µm to 200 µm (preferably approximately 60 µm), the volume resistivity is in the range from 6.0 Log Ωcm to 13.0 Log Ωcm (preferably in the range from 7.5 Log Ωcm to 12.5 Log Ωcm, and even more preferably approximately 9 Log Ωcm), and the surface resistivity is in the range from 9.0 Log Ωcm to 13.0 Log Ωcm (preferably in the range from 10.0 Log Ωcm to 12.0 Log Ωcm). The volume resistivity is a measured resistance value obtained by using Hiresta HRS probe manufactured by Mitsubishi Chemical Corporation at 100 V for 10 seconds. The surface resistivity is a measured resistance value obtained by using Hiresta HRS probe manufactured by Mitsubishi Chemical Corporation at 500 V for 10 seconds. The supporting roller 62 is grounded.

The paper cassette 70 has stored, in each of the trays, a plurality of recording media that are piled on top of one another. It is assumed that the paper type and the size of the recording media vary for each of the trays storing the recording media. In the present embodiment, the recording media are assumed to be, for example, ordinary paper or Leathac paper having prominent projections and recesses formed on the surface thereof; however, possible embodiments are not limited to this example. The recording media may be Overhead Projector (OHP) sheets or sheets of film.

The paper feeding roller 71 is arranged to abut against a recording medium P positioned at the top of one of the trays of the paper cassette 70 and supplies the abutted recording medium P.

The pair of conveyance rollers 72 convey the recording medium P supplied by the paper feeding roller 71 to a position between the secondary transfer unit opposing roller 63 and the secondary transfer roller 64 (in the direction of arrow c) with predetermined timing.

By employing a secondary transfer nip provided between the secondary transfer unit opposing roller 63 and the secondary transfer roller 64, the secondary transfer unit opposing roller 63 and the secondary transfer roller 64 altogether transfer the full-color toner image conveyed by the intermediate transfer belt 60 onto the recording medium P conveyed by the pair of conveyance rollers 72.

The secondary transfer unit opposing roller 63 is configured so that, for example, the exterior dimension thereof is 24 mm, and the diameter of the core member is 16 mm, and is configured with a conductive nitrile-rubber (NBR)-based rubber layer. The value of the resistance R of the conductive NBR-based rubber layer is in the range from 6.0 Log Ω to 12.0 Log Ω (or SUS) and may preferably be 4.0 Log Ω. The secondary transfer roller 64 is configured so that, for example, the exterior dimension thereof is 24 mm, and the diameter of the core member is 14 mm, and is configured with a conductive NBR-based rubber layer. The value of the resistance R of the conductive NBR-based rubber layer is in the range from 6.0 Log Ω to 8.0 Log Ω, and preferably in the range from 7.0 Log Ω to 8.0 Log Ω. The volume resistivity of the secondary transfer roller 64 is a measured resistance value obtained by performing a rotating measuring process while applying a weight of 5N per side and applying a bias of 1 KV to the transfer roller shaft and measuring a resistance value for each turn of the roller during a measuring time period of one minute, so as to determine an average of the resistance values as the volume resistivity.

The secondary transfer unit opposing roller 63 has connected thereto the secondary transfer power supply 200 for a transfer bias. The secondary transfer power supply 200 applies a voltage to the secondary transfer unit opposing roller 63 for the purpose of transferring the full-color toner image onto the recording medium P by employing the secondary transfer nip. More specifically, in accordance with a user setting, the secondary transfer power supply 200 may apply only a DC voltage (which hereinafter may be referred to as a "DC bias") to the secondary transfer unit opposing roller 63 or may apply a superimposed voltage (which hereinafter may be referred to as a "superimposed bias") obtained by superimposing a DC voltage and an AC voltage together to the secondary transfer unit opposing roller 63. As a result, a potential difference is generated between the secondary transfer unit opposing roller 63 and the secondary transfer roller 64, and a voltage that directs the toner from the intermediate transfer belt 60 to the recording medium P is generated. Thus, it is possible to transfer the full-color toner image onto the recording medium P. In this situation, the potential difference in the present embodiment is assumed to be calculated by subtracting "the potential of the secondary transfer roller 64" from "the potential of the secondary transfer unit opposing roller 63".

The fixing device 90 fixes the full-color toner image onto the recording medium P by applying heat and pressure to the recording medium P on which the full-color toner image has been transferred. Further, the recording medium P on which the full-color toner image has been fixed is ejected to the outside of the printing apparatus 1.

Figure 3:
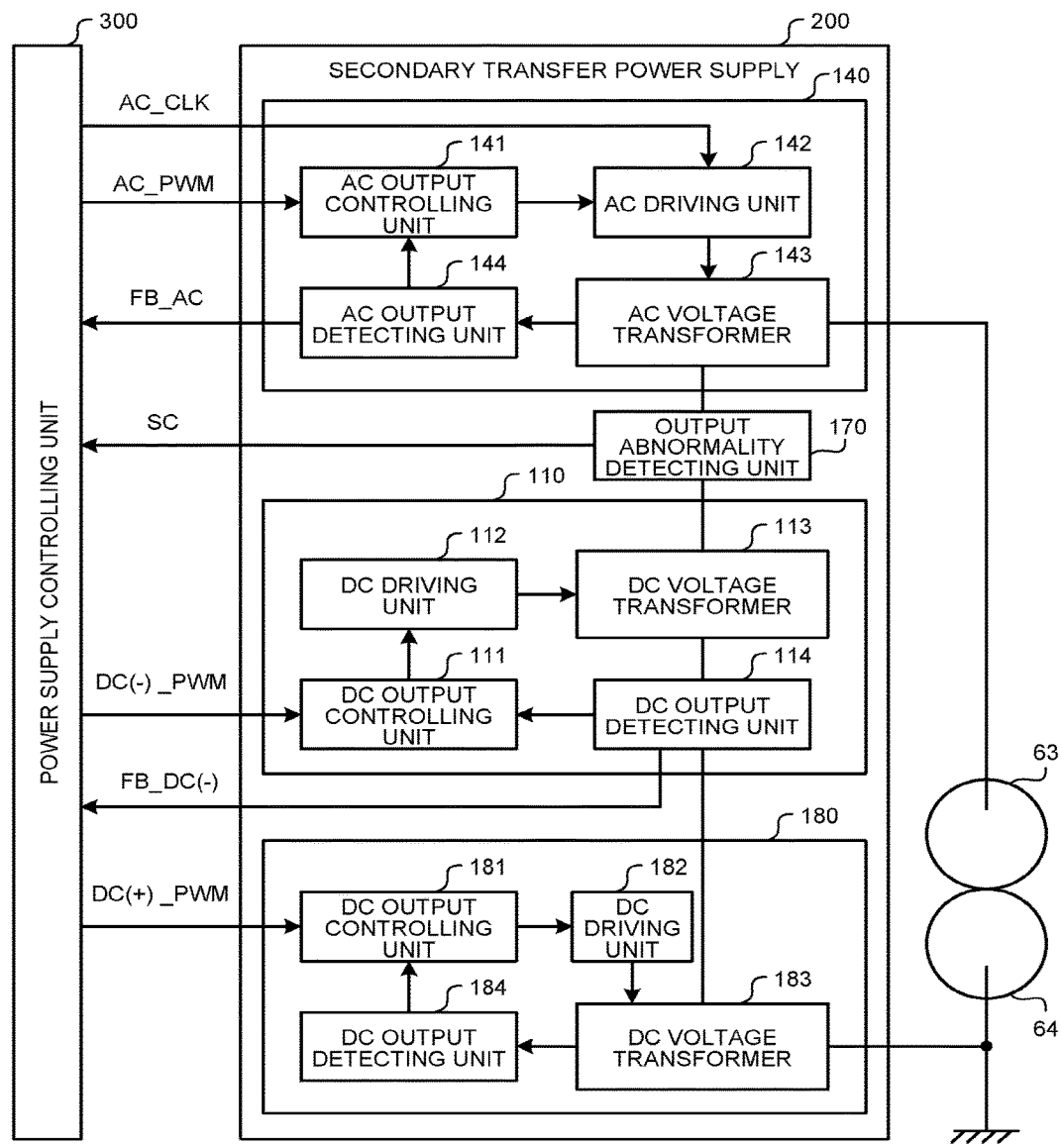
FIG. 3 is a block diagram illustrating an exemplary electric configuration of the printing apparatus according to the present embodiment.

FIG. 3 is a block diagram illustrating an exemplary electric configuration of the printing apparatus 1 according to the present embodiment. As illustrated in FIG. 3, the printing apparatus 1 includes the secondary transfer power supply 200 and a power supply controlling unit 300. The secondary transfer power supply 200 includes a direct-current (DC) power supply 110, an alternating-current (AC) power supply 140, an output abnormality detecting unit 170, and a DC power supply 180. The DC power supply 110 and the AC power supply 140 are connected in series.

The DC power supply 110 is a power supply for a toner transfer purpose and includes a DC output controlling unit 111, a DC driving unit 112, a DC voltage transformer 113, and a DC output detecting unit 114. The AC power supply 140 is a power supply for a toner oscillating purpose and includes an AC output controlling unit 141, an AC driving unit 142, an AC voltage transformer 143, and an AC output detecting unit 144. The DC power supply 180 is a power supply for a cleaning purpose and includes a DC output controlling unit 181, a DC driving unit 182, a DC voltage transformer 183, and a DC output detecting unit 184. The power supply controlling unit 300 is configured to control the secondary transfer power supply 200.

The DC output controlling unit 111 receives an input of a DC(−)_PWM signal (a DC bias output signal) that controls the output level of the DC voltage having the negative polarity, from the power supply controlling unit 300 and further receives an input of an output value of the DC voltage transformer 113 detected by the DC output detecting unit 114, from the DC output detecting unit 114. Further, the DC output controlling unit 111 controls the driving of the DC voltage transformer 113 via the DC driving unit 112, in such a manner that the output value of the DC voltage transformer 113 is equal to the output value indicated by the DC(−)_PWM signal, on the basis of a duty ratio of the input DC(−)_PWM signal and the output value of the DC voltage transformer 113.

The DC driving unit 112 drives the DC voltage transformer 113 according to the control executed by the DC output controlling unit 111.

The DC voltage transformer 113 is driven by the DC driving unit 112 and yields a DC high-voltage output (a DC bias output) having the negative polarity.

The DC output detecting unit 114 detects the output value of the DC high-voltage output that has the negative polarity and is output by the DC voltage transformer 113 and outputs the detected output value to the DC output controlling unit 111. Further, the DC output detecting unit 114 outputs the detected output value to the power supply controlling unit 300 as an FB_DC(−) signal (a feedback signal). The detected output value is output to the power supply controlling unit 300 for the purpose of enabling the power supply controlling unit 300 to control the duty of the DC(−)_PWM signal so that the transfer capability is not lowered by environment factors or loads.

In the first embodiment, the DC power supply 110 is configured to execute constant current control; however possible embodiments are not limited to this example. The DC power supply 110 may execute constant voltage control.

The AC output controlling unit 141 receives an input of an AC_PWM signal (an AC bias output signal) that controls the output level of the AC voltage from the power supply controlling unit 300 and further receives an input of the output value of the AC voltage transformer 143 detected by the AC output detecting unit 144 from the AC output detecting unit 144. Further, the AC output controlling unit 141 controls the driving of the AC voltage transformer 143 via the AC driving unit 142 in such a manner that the output value of the AC voltage transformer 143 is equal to the output value indicated by the AC_PWM signal, based on the duty ratio of the input AC_PWM signal and the output value of the AC voltage transformer 143.

The AC driving unit 142 receives an input of an AC_CLK signal that controls the output frequency of the AC voltage, from the power supply controlling unit 300. Further, the AC driving unit 142 drives the AC voltage transformer 143, based on the control executed by the AC output controlling unit 141 and the AC_CLK signal. By driving the AC voltage transformer 143 based on the AC_CLK signal, the AC driving unit 142 is able to control an output waveform generated by the AC voltage transformer 143 so as to have an arbitrary frequency indicated by the AC_CLK signal.

The AC voltage transformer 143 generates an AC voltage by being driven by the AC driving unit 142 and further generates a superimposed voltage by superimposing together the generated AC voltage and the DC high-voltage output from the DC voltage transformer 113. The AC voltage transformer 143 then outputs (applies) the generated superimposed voltage (the superimposed bias) to the secondary transfer unit opposing roller 63. In this situation, when no AC voltage is generated, the AC voltage transformer 143 outputs (applies) the DC high-voltage (the DC bias) output from the DC voltage transformer 113 to the secondary transfer unit opposing roller 63. The voltage (either the superimposed bias or the DC bias) output to the secondary transfer unit opposing roller 63 is thereafter fed back to the inside of the secondary transfer power supply 200 via the secondary transfer roller 64.

The AC output detecting unit 144 detects the output value of the AC voltage from the AC voltage transformer 143 and outputs the detected output value to the AC output controlling unit 141. Further, the AC output detecting unit 144 outputs the detected output value to the power supply controlling unit 300 as an FB_AC signal (a feedback signal). The detected output value is output to the power supply controlling unit 300 for the purpose of enabling the power supply controlling unit 300 to control the duty of the AC_PWM signal so that the transfer capability is not lowered by environment factors or loads.

In the present embodiment, the AC power supply 140 is configured to execute constant voltage control; however possible embodiments are not limited to this example. The AC power supply 140 may execute constant current control.

Further, the AC voltage generated by the AC voltage transformer 143 (the AC power supply 140) may have either a sine wave or a rectangular wave. However, in the present embodiment, it is assumed that the AC voltage has a short-pulse rectangular wave. The reason is that it is possible to better contribute to the improvement of the image quality by arranging the waveform of the AC voltage to have a short-pulse rectangular wave.

The output abnormality detecting unit 170 is arranged on an output line of the secondary transfer power supply 200 and is configured to, when an output abnormality is caused by a ground fault in the wirings or the like, output an abnormality notification signal SC to the power supply controlling unit 300. With this arrangement, the power supply controlling unit 300 is able to execute control so as to stop the secondary transfer power supply 200 from outputting the high voltage.

The DC output controlling unit 181 receives an input of a DC(+)_PWM signal (a reverse bias output signal) that controls the output level of the DC voltage having the positive polarity from the power supply controlling unit 300 and further receives an input of the output value of the DC voltage transformer 183 detected by the DC output detecting unit 184 from the DC output detecting unit 184. Further, the DC output controlling unit 181 controls the driving of the DC voltage transformer 183 via the DC driving unit 182 in such a manner that the output value of the DC voltage transformer 183 is equal to the output value indicated by the DC(+)_PWM signal, based on the duty ratio of the input DC(+)_PWM signal and the output value of the DC voltage transformer 183.

The DC driving unit 182 drives the DC voltage transformer 183 according to the control executed by the DC output controlling unit 181.

The DC voltage transformer 183 is driven by the DC driving unit 182 and yields a DC high-voltage output (a reverse bias output) having the positive polarity.

The DC output detecting unit 184 detects the output value of the DC high-voltage output that has the positive polarity and is output from the DC voltage transformer 183 and further outputs the detected output value to the DC output controlling unit 181.

Figure 4:
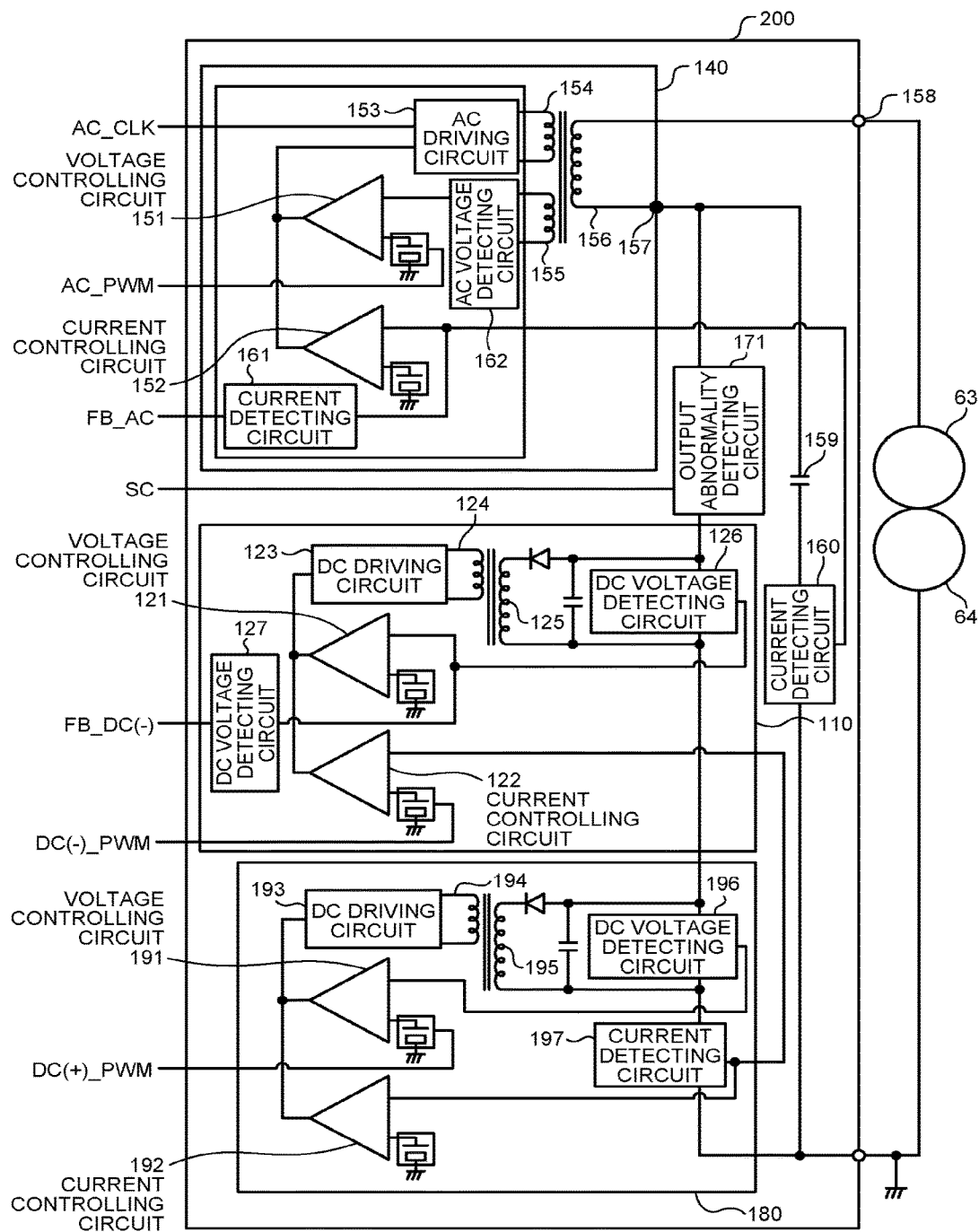
FIG. 4 is a circuit diagram illustrating an exemplary configuration of a secondary transfer power supply according to the present embodiment.

FIG. 4 is a circuit diagram illustrating an exemplary configuration of the secondary transfer power supply 200 according to the present embodiment.

The DC power supply 110 receives an input of the DC(−)_PWM signal from the power supply controlling unit 300. The input DC(−)_PWM signal is integrated, and the integrated signal is further input to a current controlling circuit 122 (a comparator). The value of the integrated DC(−)_PWM signal is used as a reference voltage in the current controlling circuit 122. Further, a current detecting circuit 197 detects the DC current output by the DC power supply 110 on an output line of the secondary transfer power supply 200 and inputs the detected output value of the DC current to the current controlling circuit 122. Further, when the DC current is low with respect to the reference voltage, the current controlling circuit 122 causes a DC driving circuit 123 of the DC high-voltage transformer to perform a driving process proactively. On the contrary, when the DC current is high with respect to the reference voltage, the current controlling circuit 122 regulates the driving process performed by the DC driving circuit 123 of the DC high-voltage transformer. With these arrangements, the DC power supply 110 is able to maintain the constant current operation.

Further, the DC voltage detecting circuit 126 detects the DC voltage output by the DC power supply 110 and inputs the detected output value of the DC voltage to a voltage controlling circuit 121 (a comparator). Further, when the output value of the DC voltage has reached an upper limit, the voltage controlling circuit 121 regulates the driving process performed by the DC driving circuit 123 of the DC high-voltage transformer. Further, the DC voltage detecting circuit 127 feeds back the output value of the DC voltage detected by the DC voltage detecting circuit 126 to the power supply controlling unit 300 as an FB_DC(−) signal.

As a result of the driving process performed by the DC driving circuit 123 according to the control executed by the current controlling circuit 122 and the voltage controlling circuit 121, an output generated by a primary-side coil N1_DC(−) 124 of the DC high-voltage transformer and a secondary-side coil N2_DC(−) 125 of the DC high-voltage transformer is smoothed by a diode and a capacitor and is subsequently input to the AC power supply 140 from an AC power supply input unit 157 as a DC voltage, before being applied to a secondary-side coil N2_AC 156 of the AC high-voltage transformer.

The AC power supply 140 receives an input of an AC_PWM signal from the power supply controlling unit 300, and the received signal is input to a voltage controlling circuit 151 (a comparator). The value of the input AC_PWM signal is used as a reference voltage in the voltage controlling circuit 151. Further, the AC voltage detecting circuit 162 predicts an output value of the AC voltage based on a mutual induction voltage generated by a primary-side coil N3_AC 155 of the AC high-voltage transformer and inputs the predicted output value of the AC voltage to the voltage controlling circuit 151. The reason is that, because the AC voltage is superimposed on the DC voltage, it is difficult to detect only the output (the AC voltage) of the AC power supply 140 itself on an output line of the secondary transfer power supply 200. Further, when the AC voltage is low with respect to the reference voltage, the voltage controlling circuit 151 causes an AC driving circuit 153 of the AC high-voltage transformer to perform a driving process proactively. On the contrary, when the AC voltage is high with respect to the reference voltage, the voltage controlling circuit 151 regulates the driving process performed by the AC driving circuit 153 of the AC high-voltage transformer. With these arrangements, the AC power supply 140 is able to maintain the constant voltage operation.

Further, the current detecting circuit 160 (an example of the current detecting unit) detects the current flowing to the AC bypass capacitor 159 (an example of the bypass capacitor) on the low-voltage side of the AC bypass capacitor 159 which is positioned on an output line of the secondary transfer power supply 200, and further inputs the detected output value of the current to a current controlling circuit 152 (a comparator). Further, when the output value of the current that was input has reached an upper limit while the AC power supply 140 is in a driving mode, the current controlling circuit 152 regulates the driving process performed by the AC driving circuit 153 of the AC high-voltage transformer. Further, the current detecting circuit 161 feeds back the output value of the current detected by the current detecting circuit 160 to the power supply controlling unit 300 as an FB_AC signal.

The AC driving circuit 153 of the AC high-voltage transformer performs the driving process according to an AND logic operation performed on the AC_CLK signal input thereto from the power supply controlling unit 300 and the voltage controlling circuit 151 and the current controlling circuit 152, and further generates an output having the same cycle as that of the AC_CLK signal.

As a result of the driving process performed by the AC driving circuit 153, the AC voltage generated by a primary-side coil N1_AC 154 of the AC high-voltage transformer is superimposed on the DC voltage applied to the secondary-side coil N2_AC 156, so that the result is output (applied) from a high-voltage output unit 158 to the secondary transfer unit opposing roller 63 as a superimposed voltage. It should be noted that, however, when the AC power supply 140 is not in the driving mode, the DC voltage applied to the secondary-side coil N2_AC 156 is output (applied) from the high-voltage output unit 158 to the secondary transfer unit opposing roller 63, without any modification applied thereto.

The output abnormality detecting circuit 171 detects an output abnormality caused by a ground fault in the wirings or the like on the output line of the secondary transfer power supply 200 and outputs the abnormality notification signal SC to the power supply controlling unit 300.

In the DC power supply 180, the DC(+)_PWM signal is input from the power supply controlling unit 300 to a voltage controlling circuit 191 (a comparator). The value of the input DC(+)_PWM signal is used as a reference voltage in the voltage controlling circuit 191. Further, the DC voltage detecting circuit 196 detects the DC voltage output by the DC power supply 180 on an output line of the secondary transfer power supply 200 and further inputs the detected output value of the DC voltage to the voltage controlling circuit 191. Further, when the DC voltage is low with respect to the reference voltage, the voltage controlling circuit 191 causes a DC driving circuit 193 of the DC high-voltage transformer to perform a driving process proactively. On the contrary, when the DC voltage is high with respect to the reference voltage, the voltage controlling circuit 191 regulates the driving process performed by the DC driving circuit 193 of the DC high-voltage transformer. With these arrangements, the DC power supply 180 maintains the constant voltage operation.

Further, the current detecting circuit 197 detects the DC current output by the DC power supply 180 and inputs the detected output value of the DC current to a current controlling circuit 192 (a comparator). Further, when the output value of the DC current has reached an upper limit, the current controlling circuit 192 regulates the driving process performed by the DC driving circuit 193 of the DC high-voltage transformer.

As a result of the driving process performed by the DC driving circuit 193 according to the control executed by the current controlling circuit 192 and the voltage controlling circuit 191, an output generated by a primary-side coil N1_DC(+) 194 of the DC high-voltage transformer and a secondary-side coil N2_DC(+) 195 of the DC high-voltage transformer is smoothed by a diode and a capacitor and is subsequently input to the AC power supply 140 from the AC power supply input unit 157 as a DC voltage, before being applied to the secondary-side coil N2_AC 156 of the AC high-voltage transformer. It should be noted that, however, when the DC power supply 180 is in a driving mode, because the DC power supply 110 and the AC power supply 140 are not in a driving mode, the DC voltage applied to the secondary-side coil N2_AC 156 is output (applied) from the high-voltage output unit 158 to the secondary transfer unit opposing roller 63, without any modification applied thereto.

Next, characteristics of the AC bypass capacitor 159 included in the secondary transfer power supply 200 will be explained.

The AC bypass capacitor 159 is configured to partially store therein the output of the AC power supply 140 for the purpose of preventing the output from being routed into the DC power supply 110. Further, because the AC bypass capacitor 159 has an extremely high impedance with respect to DC outputs, it is possible to enable the AC power supply 140 to superimpose a DC output while keeping losses small.

However, when the DC power supply 110 is started up, because no electric charge is stored in the AC bypass capacitor 159, the impedance of the AC bypass capacitor 159 is extremely low, and the output of the DC power supply 110 therefore flows into the AC bypass capacitor 159. For this reason, the DC power supply 110 would not be able to supply a sufficient amount of electric power to the secondary transfer unit opposing roller 63 until an electric charge is stored in the AC bypass capacitor 159, which would cause a delay in the rising period.

To cope with this situation, according to the present embodiment, the rising period of the DC voltage of the DC power supply 110 is arranged to be quicker even in situations where an electric charge flows into the AC bypass capacitor 159, by configuring the DC power supply 110 to yield an output that has added thereto an output corresponding to the amount flowing into the AC bypass capacitor 159. Consequently, according to the present embodiment, it is possible to shorten power-on time periods and to shorten sheet-to-sheet time periods. It is therefore possible to lower electric power consumption and to enhance printing productivity.

Figure 5:
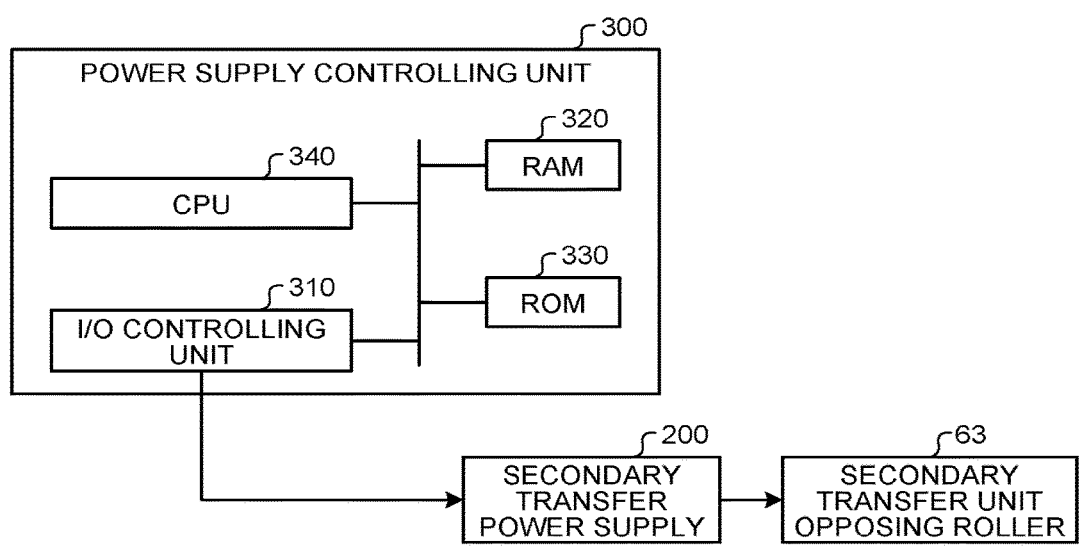
FIG. 5 is a block diagram illustrating an exemplary configuration of a power supply controlling unit included in the printing apparatus according to the present embodiment.

FIG. 5 is a block diagram illustrating an exemplary configuration of the power supply controlling unit 300 included in the printing apparatus 1 according to the present embodiment. As illustrated in FIG. 5, the power supply controlling unit 300 includes an input/output (I/O) controlling unit 310, a Random Access Memory (RAM) 320, a Read-Only Memory (ROM) 330, and a Central Processing Unit (CPU) 340.

The I/O controlling unit 310 is configured to control inputs and outputs of various types of signals and to control inputs and outputs of signals to and from the secondary transfer power supply 200.

The RAM 320 is a volatile storage device (a memory) and is used as a working area of the CPU 340 and the like.

The ROM 330 is a non-volatile read-only storage device (a memory) and stores therein various types of programs executed during the power supply control and data used in various types of processing processes performed during the power supply control. Alternatively, the ROM 330 may be realized with a flash memory or the like so that it is possible to write data thereto.

The CPU 340 receives a user setting related to high-voltage outputs through an operation panel or the like and causes the secondary transfer power supply 200 to yield a high-voltage output corresponding to the received user setting via the I/O controlling unit 310. Examples of the user setting related to high-voltage outputs include a high-voltage output only with a DC bias and a high-voltage output with a superimposed bias. Further, the CPU 340 executes feedback control so as to cause the DC power supply 110 to yield a DC current output that has added thereto a DC current corresponding to the amount that flowed to the AC bypass capacitor 159.

Next, a method for shortening the rising period of the DC voltage output by the DC power supply 110 (the DC voltage output by the primary-side coil N1_DC(−) 124 of the DC high-voltage transformer and the secondary-side coil N2_DC(−) 125 of the DC high-voltage transformer) according to the present embodiment will be explained. In this situation, "rising" denotes a transition from the state in which there is no electric potential difference (0 kV) to the state in which there is an electric potential difference (either a positive one or a negative one). Further, as additional information, "falling" denotes a transition from the state in which there is an electric potential difference (either a positive one or a negative one) to the state in which there is no electric potential difference (0 kV).

First, an example in which the secondary transfer power supply 200 outputs only a DC voltage (an example in which no AC voltage is superimposed) will be explained.

Figure 6:
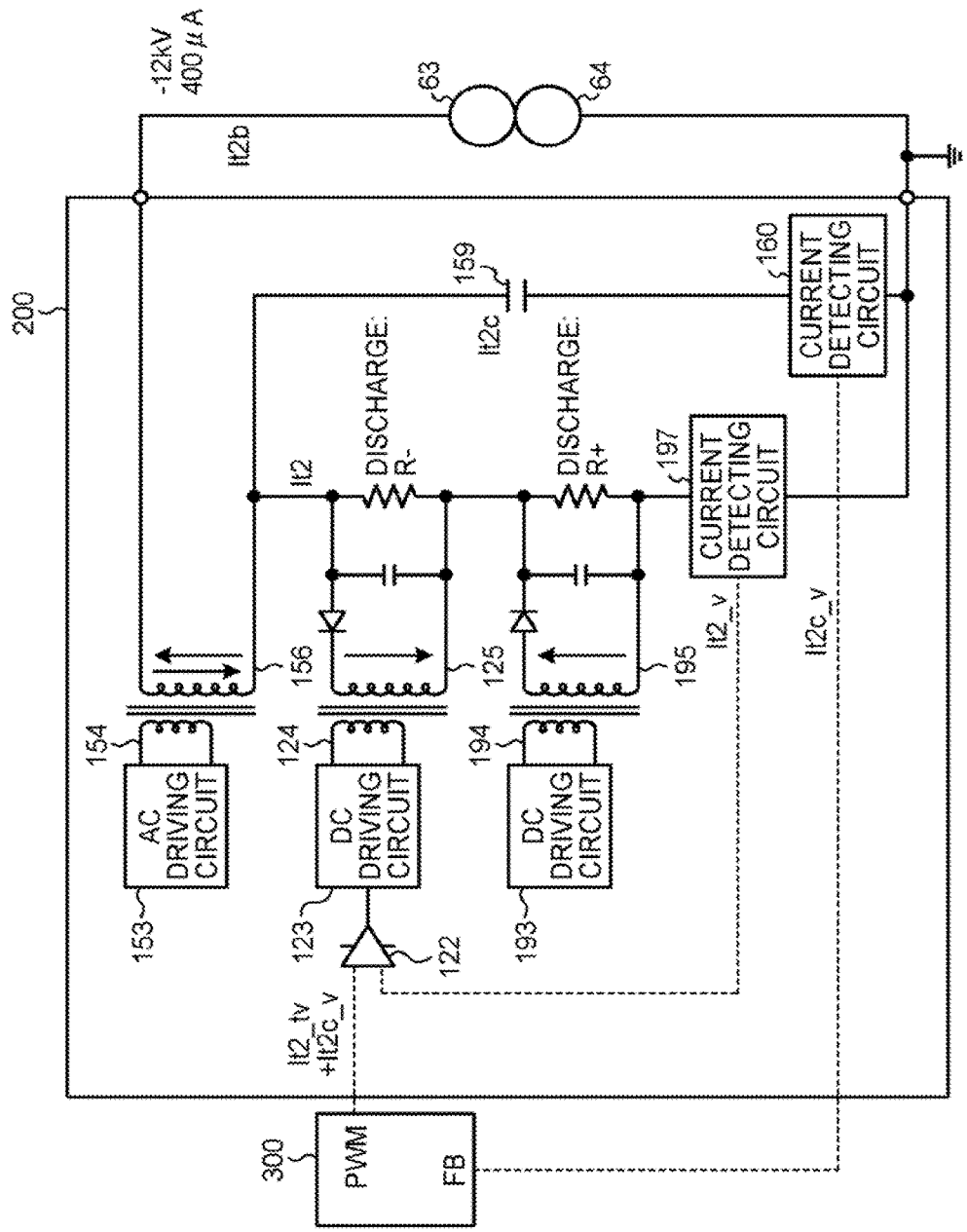
FIG. 6 is a diagram schematically illustrating the secondary transfer power supply and the power supply controlling unit for the purpose of explaining a method for shortening the rising period of a direct-current voltage according to the present embodiment.
Figure 7:
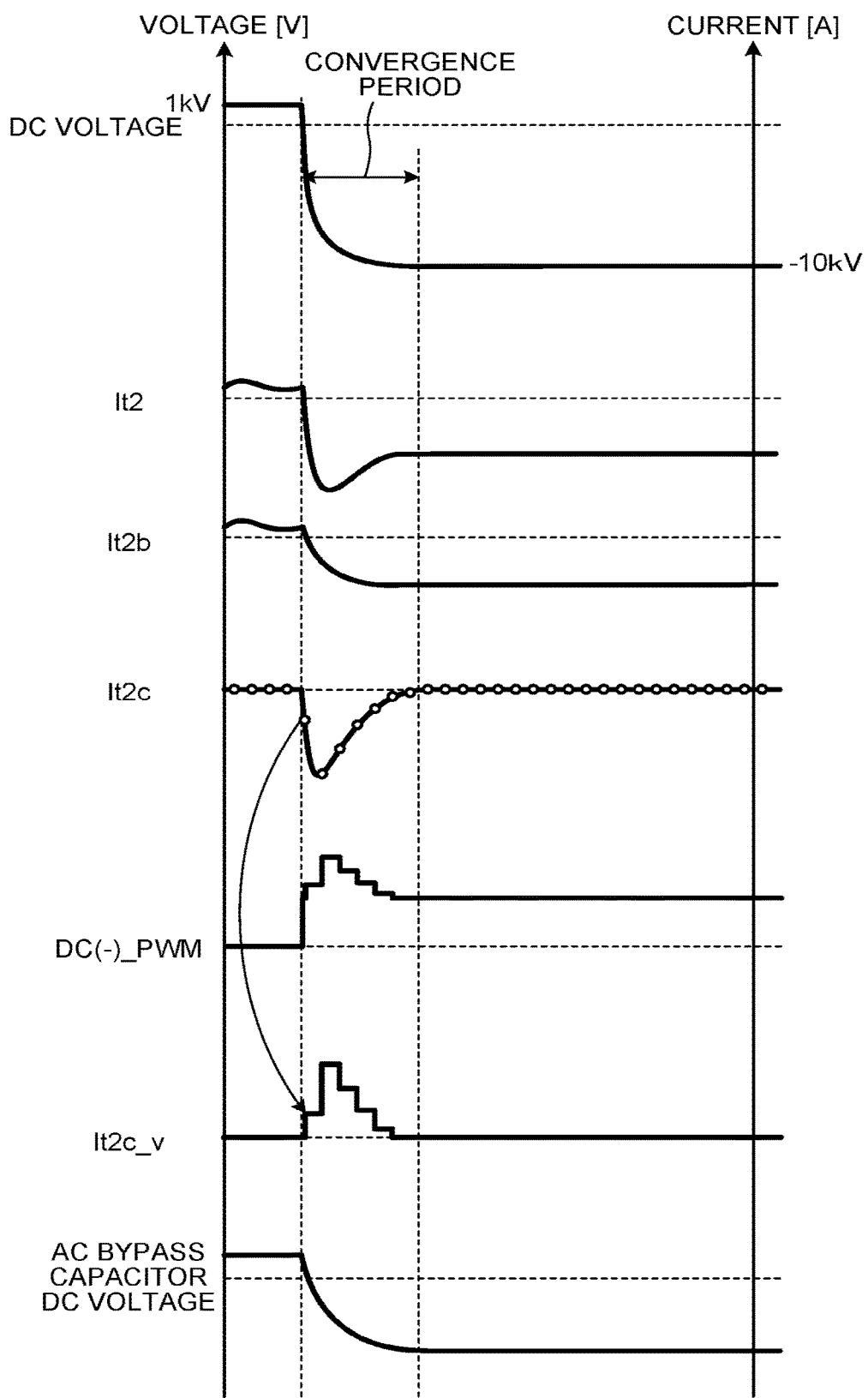
FIG. 7 is a timing chart for explaining the method for shortening the rising period of the direct-current voltage according to the present embodiment.

FIG. 6 is a diagram schematically illustrating the secondary transfer power supply 200 and the power supply controlling unit 300 for the purpose of explaining the method for shortening the rising period of the DC voltage according to the present embodiment. FIG. 7 is a timing chart for explaining the method for shortening the rising period of the DC voltage according to the present embodiment.

The current detecting circuit 197 detects the DC current (an example of the first direct current; hereinafter "DC current It2") that is output in conjunction with the DC voltage output by the primary-side coil N1_DC(−) 124 of the DC high-voltage transformer and the secondary-side coil N2_DC(−) 125 of the DC high-voltage transformer and further inputs an output value It2_v of the detected DC current It2 to the current controlling circuit 122.

In this situation, the DC current It2 is equal to a sum of the DC current (an example of the second direct current; hereinafter, "DC current It2c") flowing to and stored in the AC bypass capacitor 159 and the DC current (an example of the third direct current; hereinafter, "DC current It2b") flowing to the secondary transfer unit opposing roller 63.

Further, the current detecting circuit 160 detects the DC current It2c and outputs an output value It2c_v (an example of the value indicating the second direct current) of the detected DC current It2c. After that, the output value It2c_v output by the current detecting circuit 160 is fed back to the power supply controlling unit 300 as an FB_AC signal.

The power supply controlling unit 300 controls the duty of the DC(−)_PWM signal by taking the output value It2c_v fed back as the FB_AC signal into account of a target value It2_tv for the DC current It2 observed after the rising of the DC voltage and further outputs the DC(−)_PWM signal to the current controlling circuit 122. In other words, the power supply controlling unit 300 causes the DC power supply 110 to control the level of the DC voltage output therefrom, based on the target value It2_tv and the output value It2c_v.

More specifically, the power supply controlling unit 300 controls the duty of the DC(−)_PWM signal in such a manner that the value (an integrated value of the DC(−)_PWM signal) input to the current controlling circuit 122 is equal to It2_tv+It2c_v, and further outputs the DC(−)_PWM signal to the current controlling circuit 122. In other words, the power supply controlling unit 300 causes the DC power supply 110 to control the level of the DC voltage output therefrom in such a manner that the output value It2_v of the DC current It2 is equal to It2_tv+It2c_v.

As explained above, in the present embodiment, the feedback control is executed so that the DC current is output from the primary-side coil N1_DC(−) 124 of the DC high-voltage transformer and the secondary-side coil N2_DC(−) 125 of the DC high-voltage transformer, after adding thereto the DC current corresponding to the amount that flowed to the AC bypass capacitor 159, instead of flowing to the secondary transfer unit opposing roller 63.

With this arrangement, while the DC current It2c is increasing, the current controlling circuit 122 causes the DC driving circuit 123 of the DC high-voltage transformer to perform the driving process proactively, in such a manner that the output value It2_v of the DC current It2 is equal to It2_tv+It2c_v.

Consequently, as illustrated in FIG. 7, it is possible to arrange the DC voltage output by the DC power supply 110 to rise rapidly, even in the situation where, when the DC voltage starts rising, much of the DC current It2 flows to the AC bypass capacitor 159 as the DC current It2c.

In contrast, while the DC current It2c is decreasing, current controlling circuit 122 regulates the driving process performed by the DC driving circuit 123 of the DC high-voltage transformer in such a manner that the output value It2_v of the DC current It2 is equal to It2_tv+It2c_v.

Consequently, as illustrated in FIG. 7, the DC current It2 is gradually converged to the target value without undershooting, and also, the DC voltage that has risen rapidly is also gradually converged to the target value (−10 kV).

As explained above, according to the present embodiment, it is possible to shorten the rising period (the convergence period) of the DC voltage output by the DC power supply 110. As a result, it is possible to shorten the "power-on" time periods and to shorten the sheet-to-sheet time periods. It is therefore possible to lower electric power consumption and to enhance printing productivity.

In addition, according to the present embodiment, it is possible to cause the DC voltage to rise within the expected period of time because the DC current It2 output by the DC power supply 110 does not undershoot. As a result, it is possible to ensure that the DC bias has a value required by the transfer of the image during the image transfer process. It is therefore possible to prevent the image quality from being degraded (e.g., occurrence of uneven density).

After the DC voltage has risen, the power supply controlling unit 300 controls the duty of the DC(−)_PWM signal, while also taking the aforementioned FB_DC(−) signal into account.

Figure 8:
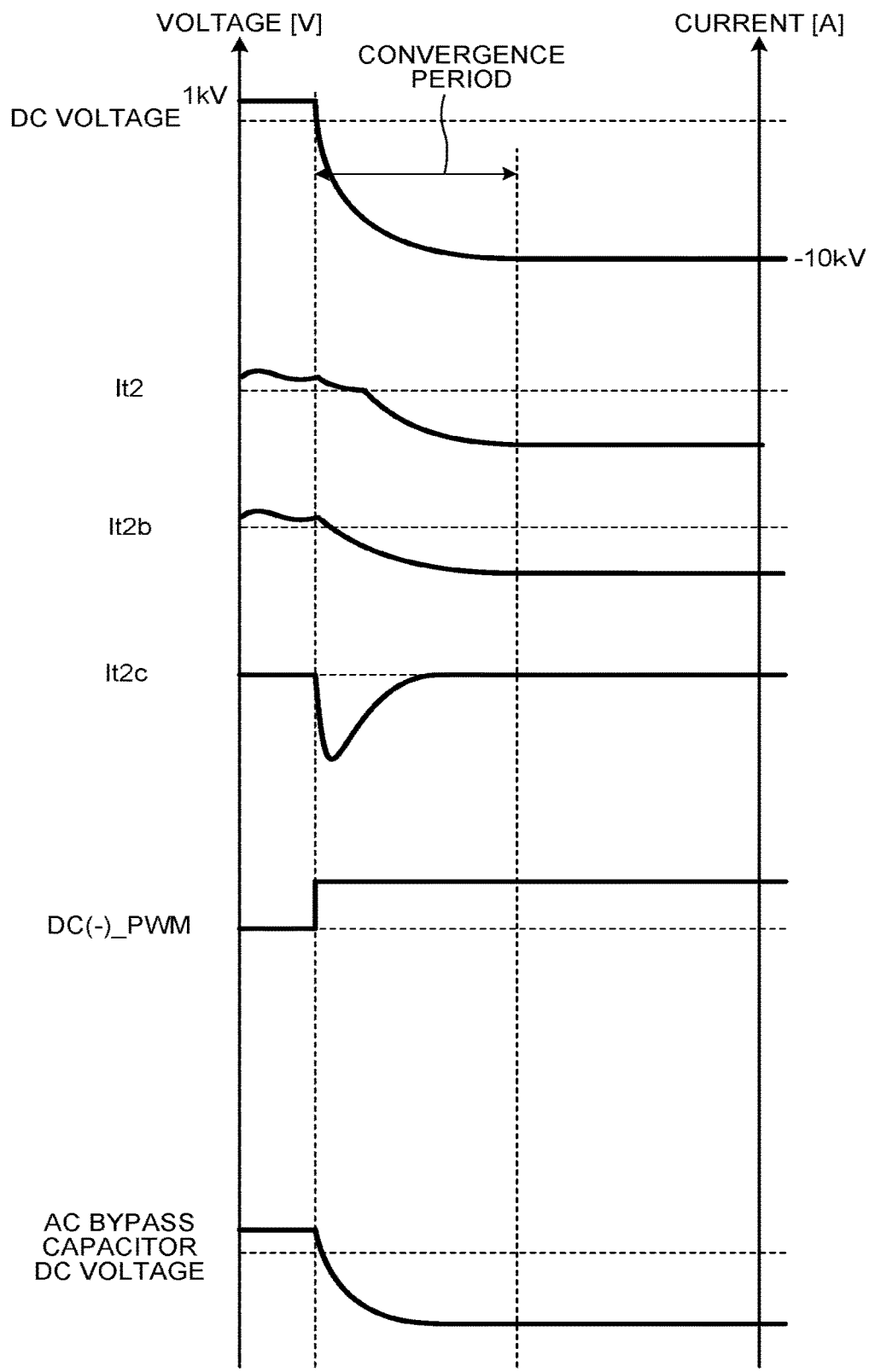
FIG. 8 is a timing chart illustrating a comparison example for the present embodiment.
Figure 9:
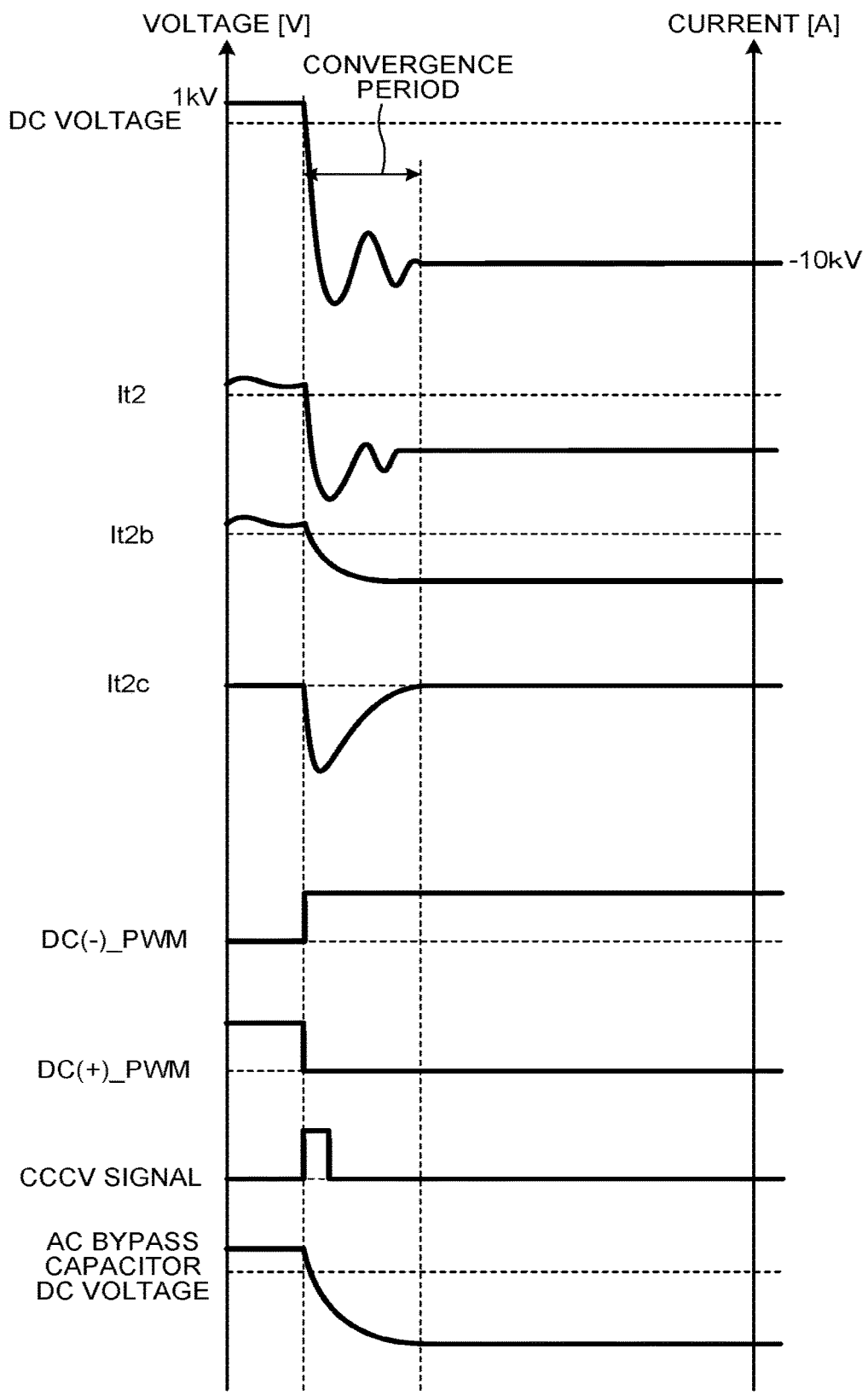
FIG. 9 is a timing chart illustrating another comparison example for the present embodiment.

FIGS. 8 and 9 are timing charts illustrating comparison examples for the present embodiment. FIG. 8 is a timing chart illustrating an example in which the DC voltage is caused to rise normally. FIG. 9 is a timing chart illustrating an example in which the DC voltage is caused to rise by switching from constant voltage control to constant current control as in the conventional example.

In the example illustrated in FIG. 8, because feedback control such as that in the present embodiment is not executed, the power supply controlling unit 300 would control the duty of the DC(−)_PWM signal in such a manner that the value (the integrated value of the DC(−)_PWM signal) input to the current controlling circuit 122 is equal to It2_tv and would further output the DC(−)_PWM signal to the current controlling circuit 122.

Consequently, as illustrated in FIG. 8, the DC voltage output from the DC power supply 110 would rise gradually, in the situation where, when the DC voltage starts rising, much of the DC current It2 flows to the AC bypass capacitor 159 as the DC current It2c and would subsequently be converged to the target value (−10 kV) gradually.

Accordingly, in the example illustrated in FIG. 8, it would be impossible to shorten the rising period (the convergence period) of the DC voltage output by the DC power supply 110. As a result, it would also be impossible to shorten the "power-on" time periods or to shorten the sheet-to-sheet time periods. It would therefore be impossible to lower electric power consumption and to enhance printing productivity.

Further, in the example illustrated in FIG. 9, while a CCCV signal is at a high level, the DC power supply 110 would output the DC voltage by executing the constant voltage control. Consequently, the DC voltage output by the DC power supply 110 would be caused to rise rapidly, even in the situation where, when the DC voltage starts rising, much of the DC current It2 flows to the AC bypass capacitor 159 as the DC current It2c.

Further, when the CCCV signal is switched to a low level, the DC power supply 110 would output the DC voltage by switching the controlling method to the constant current control. However, because the start of the constant current control would be delayed due to an influence of the residual charge within the DC power supply 110, the DC current It2 would undershoot before the constant current control is started. Consequently, the DC voltage would be converged to the target value (−10 kV) after fluctuating up and down in a wide range.

Accordingly, in the example illustrated in FIG. 9, it might be impossible to converge the DC voltage to the target value within an expected period of time, and it might be impossible to cause the DC voltage to rise within an expected period of time, depending on the degree of the undershooting of the DC current It2 output by the DC power supply 110. As a result, it would be impossible to ensure that the DC bias has a value required by the transfer of the image during the image transfer process and would be impossible to prevent the image quality from being degraded (e.g., occurrence of uneven density).

Figure 10:
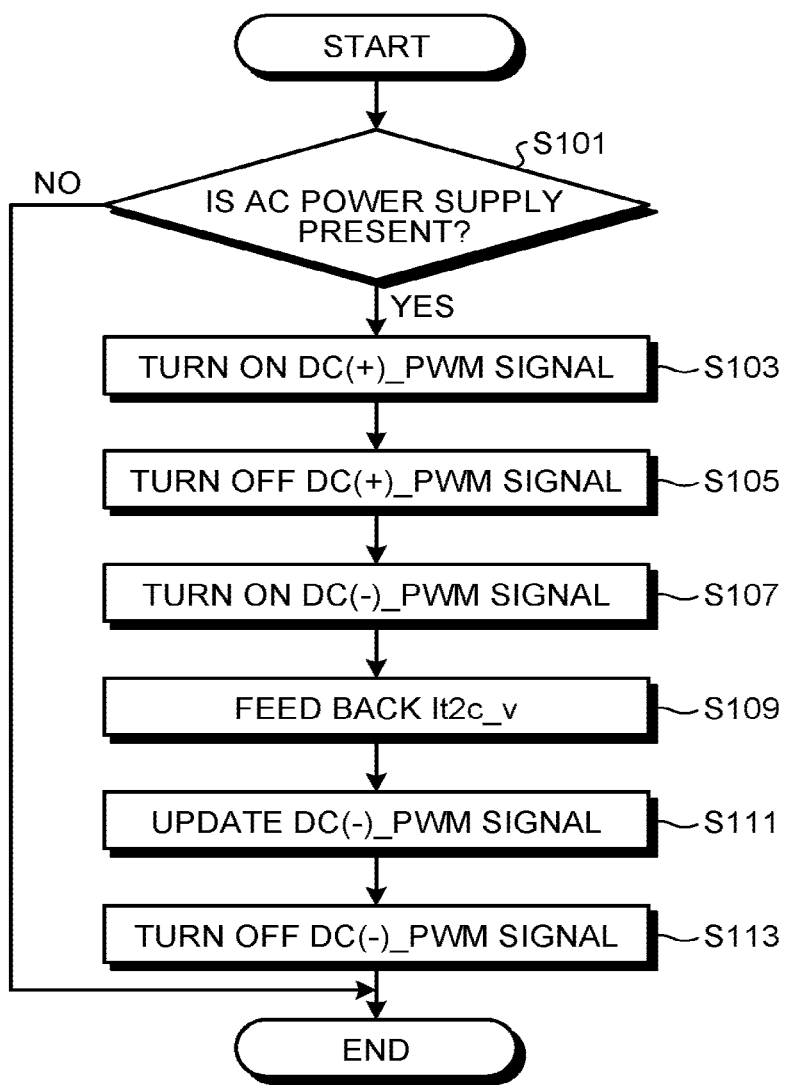
FIG. 10 is a flowchart illustrating an example of control executed when the secondary transfer power supply according to the present embodiment outputs only a direct-current voltage.

FIG. 10 is a flowchart illustrating an example of the control executed when the secondary transfer power supply 200 according to the present embodiment outputs only the DC voltage.

First, when the AC power supply 140 is present (when the AC power supply 140 is connected in series to the DC power supply 110) (step S101: Yes), the power supply controlling unit 300 turns on and outputs the DC(+)_PWM signal to the DC power supply 180 (step S103). As a result, the DC power supply 180 (the secondary transfer power supply 200) outputs a DC voltage having the positive polarity and being at the level indicated by the DC(+)_PWM signal. This procedure is taken for the purpose of arranging the toner to stay on the intermediate transfer belt 60 side before the transfer process.

Subsequently, at the time when the recording medium reaches the secondary transfer nip, the power supply controlling unit 300 turns off and stops the DC(+)_PWM signal from being output to the DC power supply 180 (step S105). Accordingly, the DC power supply 180 (the secondary transfer power supply 200) stops outputting the DC voltage that has the positive polarity and is at the level indicated by the DC(+)_PWM signal.

At the same time, the power supply controlling unit 300 turns on and outputs the DC(−)_PWM signal to the DC power supply 110 (step S107). Accordingly, the DC power supply 110 (the secondary transfer power supply 200) outputs a DC voltage having the negative polarity and being at the level indicated by the DC(−)_PWM signal.

In this situation, the current detecting circuit 160 detects the DC current It2c, so that the output value It2c_v of the detected DC current It2c is fed back to the power supply controlling unit 300 as an FB_AC signal (step S109). After that, the power supply controlling unit 300 updates the DC(−)_PWM signal while taking the output value It2c_v fed back as the FB_AC signal into account of the target value It2_tv for the DC current It2 observed after the rising of the DC voltage and further outputs the updated DC(−)_PWM signal to the DC power supply 110 (step S111).

The processes at steps S109 through S111 are continued until the DC(−)_PWM signal is turned off.

Subsequently, at the time when the recording medium leaves the secondary transfer nip, the power supply controlling unit 300 turns off and stops the DC(−)_PWM signal from being output to the DC power supply 110 (step S113). Accordingly, the DC power supply 110 (the secondary transfer power supply 200) stops outputting the DC voltage that has the negative polarity and is at the level Indicated by the DC(−)_PWM signal.

As explained above, according to the present embodiment, it is possible to shorten the rising period (the convergence period) of the DC voltage output by the DC power supply 110. As a result it is possible to shorten the "power-on" time periods and the sheet-to-sheet time periods. It is therefore possible to lower electric power consumption and to enhance printing productivity.

Further, according to the present embodiment, because the DC current It2 output by the DC power supply 110 does not undershoot, it is possible to cause the DC voltage to rise within the expected period of time. As a result, it is possible to ensure that the DC bias has a value required by the transfer of the image during the image transfer process. It is therefore possible to prevent the image quality from being degraded (e.g., occurrence of uneven density).

Next, an example in which the secondary transfer power supply 200 outputs a superimposed voltage will be explained. However, because the rising period of the AC voltage output by the AC power supply 140 is shorter than the rising period of the DC voltage output by the DC power supply 110 and because, in the present embodiment, the AC voltage is caused to rise after the DC voltage rises, the situation is basically the same as the situation where the secondary transfer power supply 200 outputs only the DC voltage.

Figure 11:
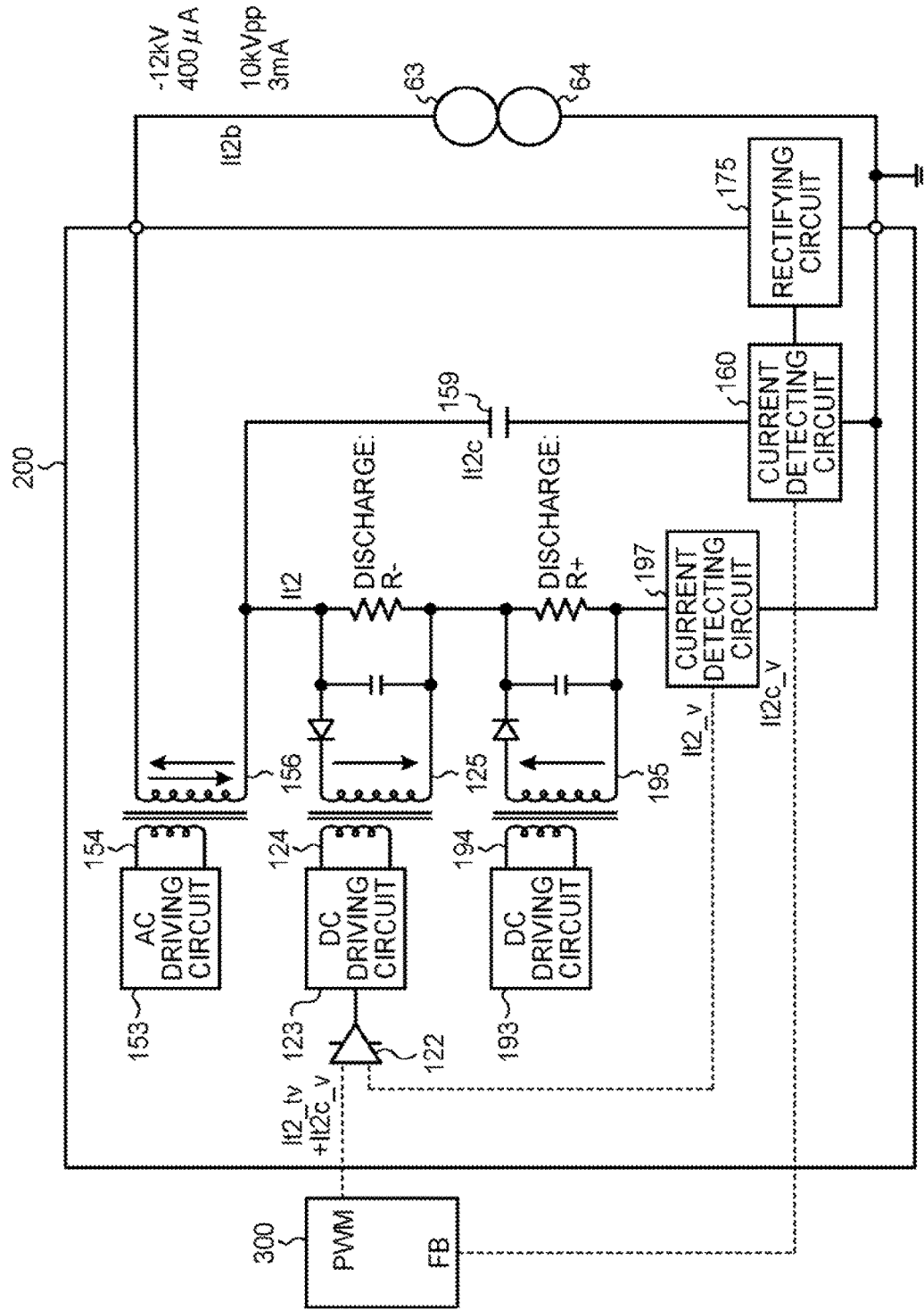
FIG. 11 is a diagram schematically illustrating the secondary transfer power supply and the power supply controlling unit for the purpose of explaining a method for shortening the rising period of the direct-current voltage according to the present embodiment.
Figure 12:
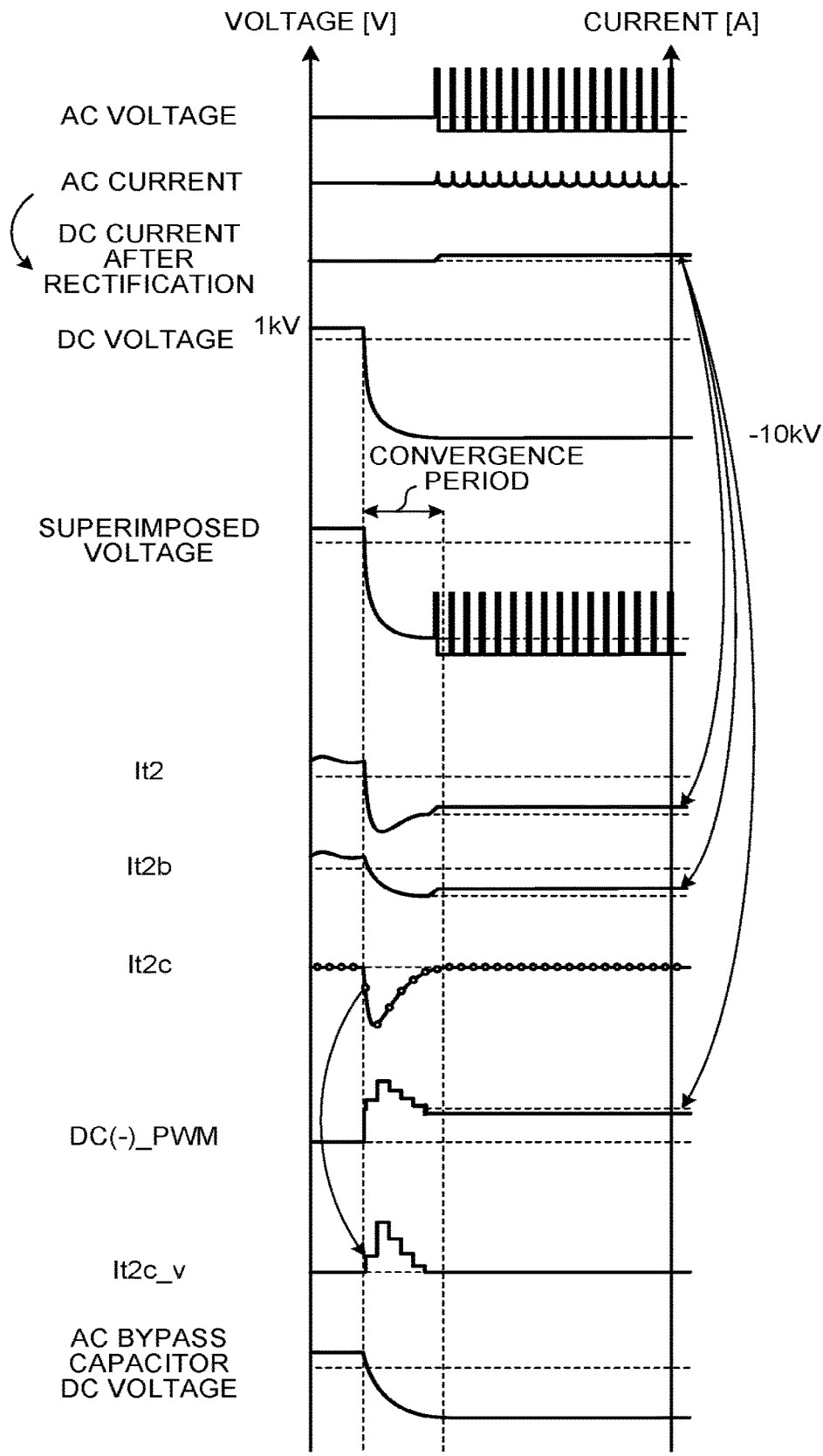
FIG. 12 is a timing chart for explaining the method for shortening the rising period of the direct-current voltage according to the present embodiment.

FIG. 11 is a diagram schematically illustrating the secondary transfer power supply 200 and the power supply controlling unit 300 for the purpose of explaining a method for shortening the rising period of the DC voltage according to the present embodiment. FIG. 12 is a timing chart for explaining the method for shortening the rising period of the DC voltage according to the present embodiment.

As mentioned above, the operation until the rising of the DC voltage is the same as that in the situation where the secondary transfer power supply 200 outputs only the DC voltage. Thus, explanation thereof will be omitted.

When the secondary transfer power supply 200 outputs the superimposed voltage, the current detecting circuit 160 smooths a superimposed current output by the AC power supply 140 into a DC current by employing a rectifying circuit 175, further detects the smoothed DC current, and outputs the output value of the detected DC current. After that, the power supply controlling unit 300 controls the duty of the DC(−)_PWM signal by adding the output value to the target value It2_tv and further outputs the DC(−)_PWM signal to the current controlling circuit 122.

Figure 13:
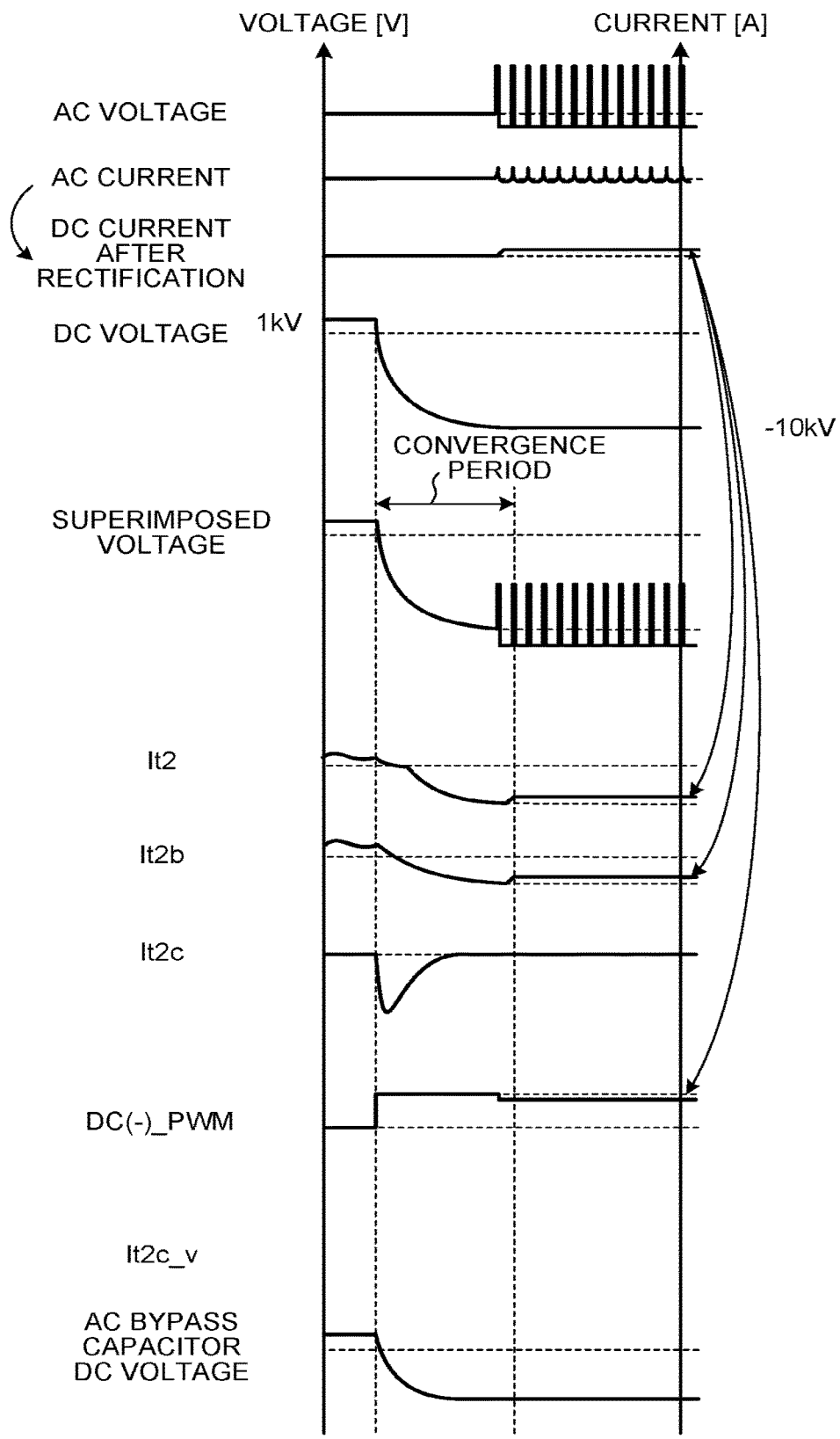
FIG. 13 is a timing chart illustrating a comparison example for the present embodiment.
Figure 14:
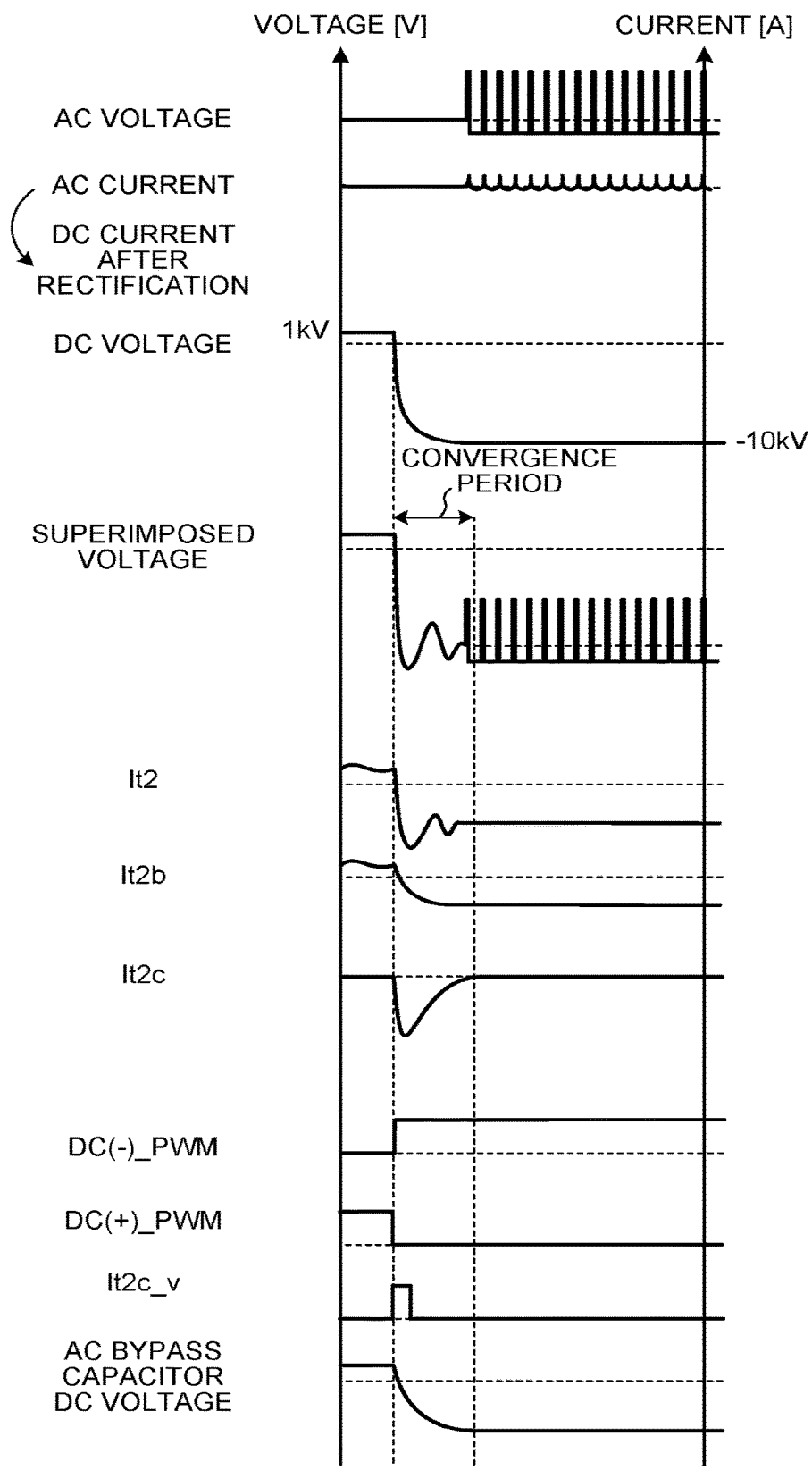
FIG. 14 is a timing chart illustrating another comparison example for the present embodiment.

FIGS. 13 and 14 are timing charts illustrating comparison examples for the present embodiment. FIG. 13 is a timing chart illustrating an example in which the DC voltage is caused to rise normally. FIG. 14 is a timing chart illustrating an example in which the DC voltage is caused to rise by switching from constant voltage control to constant current control as in the conventional example.

As mentioned above, the operation until the rising of the DC voltage is the same as that in the situation where the secondary transfer power supply 200 outputs only the DC voltage. Problems with the operation illustrated in FIG. 13 are the same as the problems explained with reference to FIG. 8. Problems with the operation illustrated in FIG. 14 are the same as the problems explained with reference to FIG. 9. Thus, detailed explanations thereof will be omitted.

Figure 15:
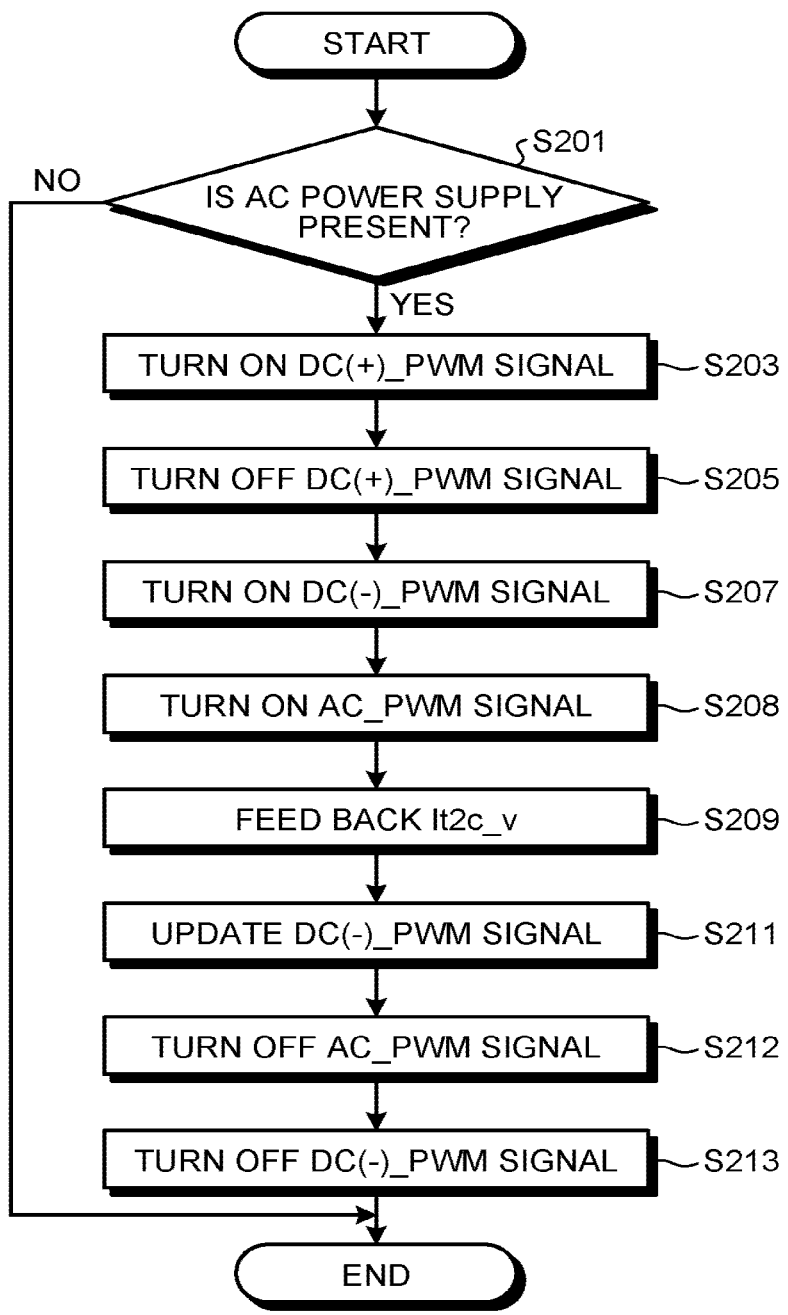
FIG. 15 is a flowchart illustrating an example of control executed when the secondary transfer power supply according to the present embodiment outputs a superimposed voltage.

FIG. 15 is a flowchart illustrating an example of the control executed when the secondary transfer power supply 200 according to the present embodiment outputs a superimposed voltage.

At first, the processes at steps S201 through S207 are the same as the processes at steps S101 through S107 in the flowchart in FIG. 10.

Subsequently, the power supply controlling unit 300 turns on and outputs the AC_PWM signal to the AC power supply 140 (step S208). Accordingly, the AC power supply 140 (the secondary transfer power supply 200) superimposes an AC voltage at the level indicated by the AC_PWM signal onto the DC voltage output by the DC power supply 110, and further outputs the superimposed voltage.

After that, the processes at steps S209 through S211 are the same as the processes at steps S109 through S111 in the flowchart in FIG. 10. It should be noted that, however, from step S207 up to step S208, the current detecting circuit 160 detects the DC current It2c. From step S208 up to when the AC_PWM signal is turned off, the current detecting circuit 160 smooths the superimposed current into a DC current and detects the smoothed DC current.

Subsequently, at the time when the recording medium leaves the secondary transfer nip, the power supply controlling unit 300 turns off and stops the AC_PWM signal from being output to the AC power supply 140 (step S212). Accordingly, the AC power supply 140 stops outputting the AC voltage at the level indicated by the AC_PWM signal.

After that, the process up to step S213 is the same as the process at step S113 in the flowchart in FIG. 10.

As explained above, also in the situation where the secondary transfer power supply 200 outputs the superimposed voltage, it is possible to achieve the same advantageous effects that are achieved when the secondary transfer power supply 200 outputs only the DC voltage.

MODIFICATION EXAMPLES

The present disclosure is not limited to the embodiments described above, and it is possible to apply various modifications thereto.

First Modification Example

In the embodiment described above, the example is explained in which the DC current It2c is directly detected. However, it is also acceptable to detect the DC current It2c indirectly.

Figure 16:
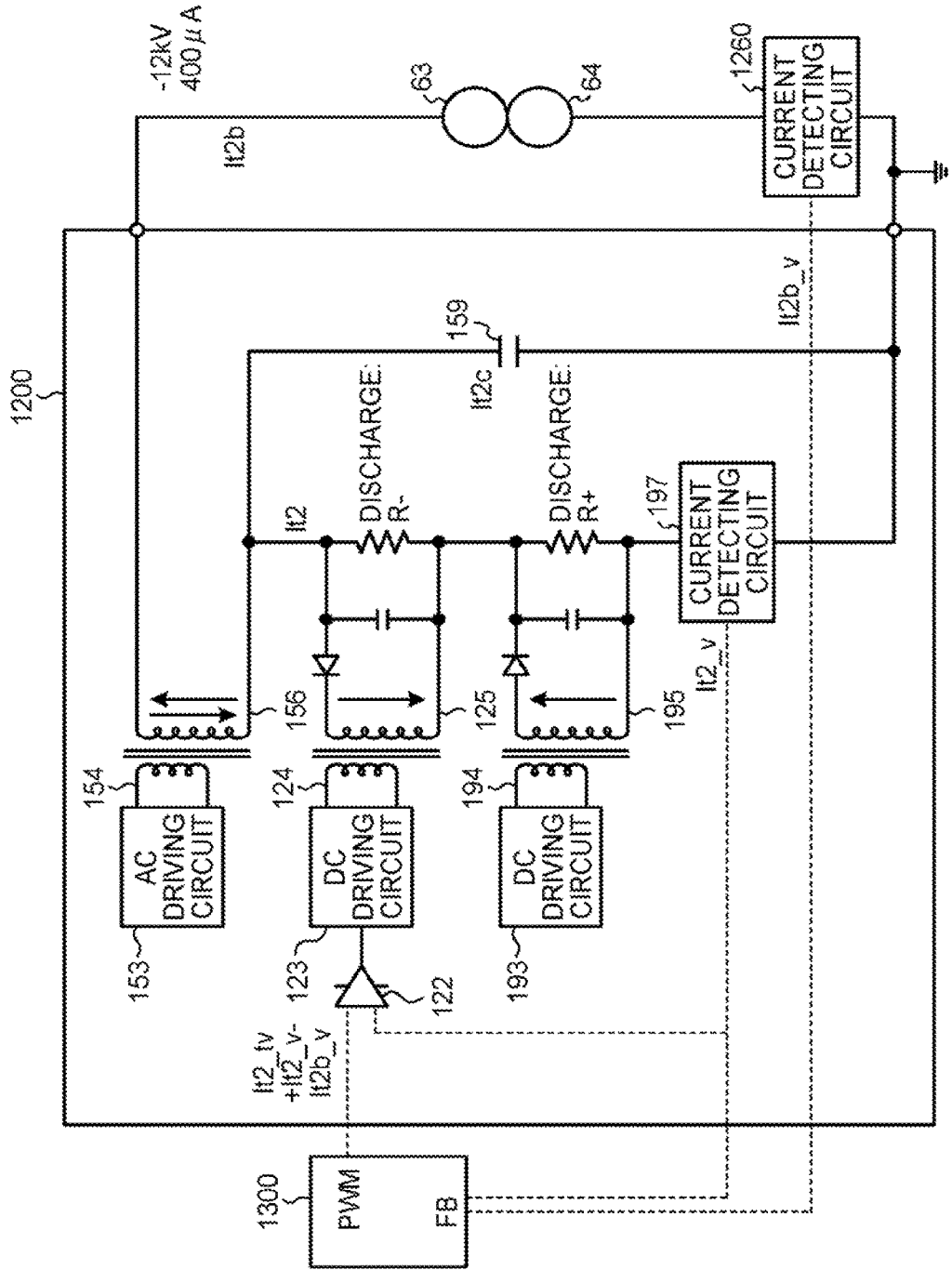
FIG. 16 is a diagram schematically illustrating a secondary transfer power supply and a power supply controlling unit for the purpose of explaining a method for shortening the rising period of a direct-current voltage according to a first modification example of the present embodiment.

FIG. 16 is a diagram schematically illustrating a secondary transfer power supply 1200 and a power supply controlling unit 1300 for the purpose of explaining a method for shortening the rising period of a DC voltage according to a first modification example.

A current detecting circuit 197 (an example of the first current detecting unit) detects the DC current It2 and further inputs the output value It2_v (an example of the first output value) of the detected DC current It2 to the current controlling circuit 122, and also, feeds back the same to the power supply controlling unit 1300.

Further, a current detecting circuit 1260 detects the DC current It2b and further outputs an output value It2b_v (an example of the second output value) of the detected DC current It2b. After that, the output value It2b_v output by the current detecting circuit 1260 is fed back to the power supply controlling unit 1300 as an FB_AC signal.

The power supply controlling unit 1300 controls the duty of the DC(−)_PWM signal by taking the fed-back output value It2_v and the output value It2b_v into account of the target value It2_tv for the DC current It2 observed after the rising of the DC voltage and further outputs the DC(−)_PWM signal to the current controlling circuit 122. In other words, the power supply controlling unit 1300 causes the DC power supply 110 to control the level of the DC voltage output therefrom, based on the target value It2_tv, the output value It2_v, and the output value It2b_v.

More specifically, the power supply controlling unit 1300 controls the duty of the DC(−)_PWM signal in such a manner that the value (the integrated value of the DC(−)_PWM signal) input to the current controlling circuit 122 is equal to It2_tv+It2_v−It2b_v and further outputs the DC(−)_PWM signal to the current controlling circuit 122. In other words, the power supply controlling unit 1300 causes the DC power supply 110 to control the level of the DC voltage output therefrom in such a manner that the output value It2_v of the DC current It2 is equal to It2_tv+It2_v−It2b_v. In this situation, It2_v−It2b_v=It2c_v is satisfied.

As explained above, in the first modification example also, the feedback control is executed so that the DC current is output from the primary-side coil N1_DC(−) 124 of the DC high-voltage transformer and the secondary-side coil N2_DC(−) 125 of the DC high-voltage transformer, after adding thereto the DC current corresponding to the amount that flowed to the AC bypass capacitor 159, instead of flowing to the secondary transfer unit opposing roller 63.

Accordingly, it is possible to achieve advantageous effects that are the same as those in the embodiment described above. In the first modification example, the value of It2c_v (It2_v−It2b_v) is calculated by detecting the DC current It2 and the DC current It2b, the level of precision of the feedback control is expected to be improved compared to that in the embodiment described above.

Second Modification Example

In the embodiment described above, the example is explained in which the power supply controlling unit is provided on the outside of the secondary transfer power supply; however, it is also acceptable to provide the power supply controlling unit on the inside of the secondary transfer power supply.

Figure 17:
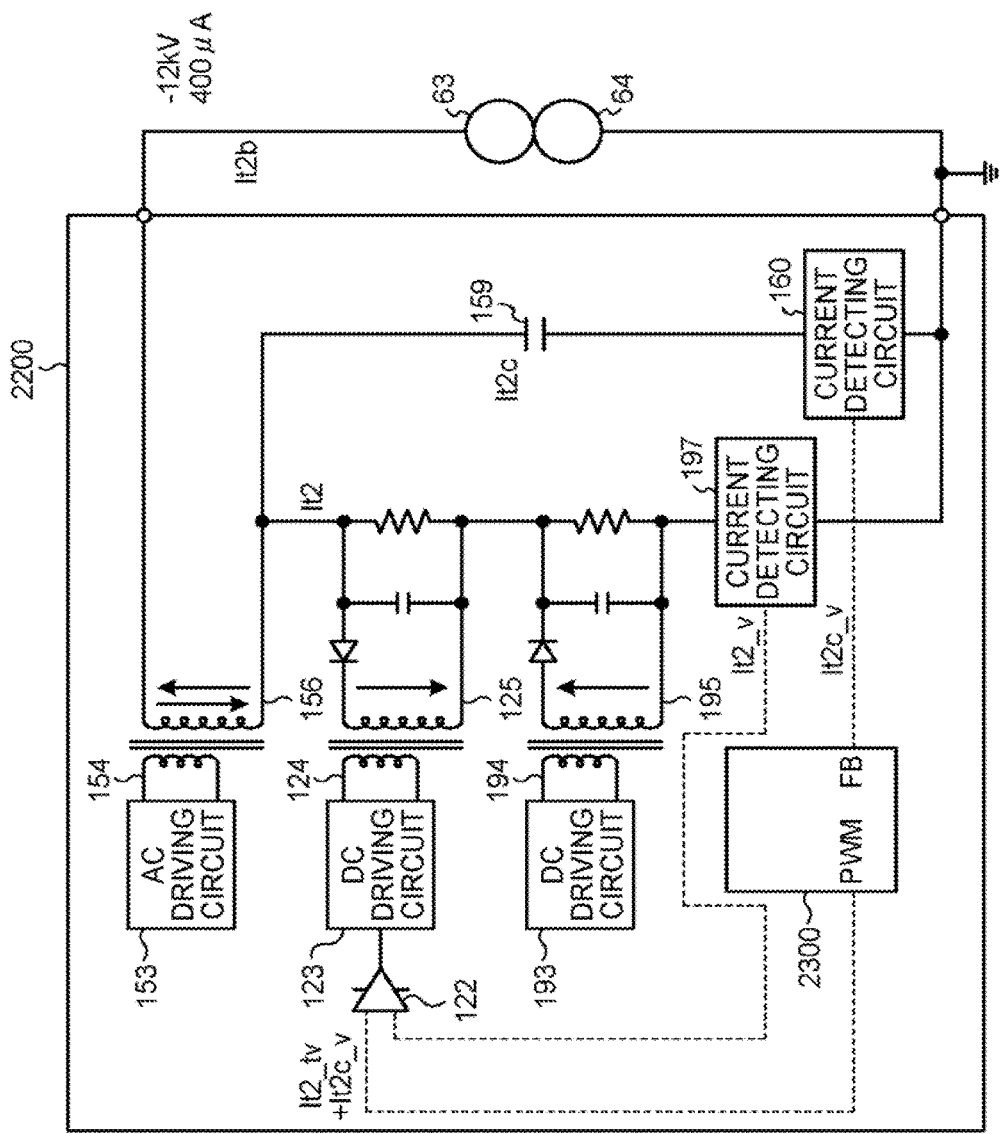
FIG. 17 is a diagram schematically illustrating a secondary transfer power supply and a power supply controlling unit for the purpose of explaining a method for shortening the rising period of a direct-current voltage when the secondary transfer power supply according to a second modification example of the present embodiment outputs only a direct-current voltage (without superimposing an alternating-current voltage thereon)

FIG. 17 is a diagram schematically illustrating a secondary transfer power supply 2200 and a power supply controlling unit 2300 for the purpose of explaining a method for shortening the rising period of a DC voltage when the secondary transfer power supply 2200 according to a second modification example outputs only the DC voltage (without superimposing an AC voltage thereon).

In this situation, although the power supply controlling unit 2300 is provided on the inside of the secondary transfer power supply 2200, because the operations of the power supply controlling unit 2300 and the secondary transfer power supply 2200 are the same as those in the embodiment described above, detailed explanations thereof will be omitted.

Figure 18:
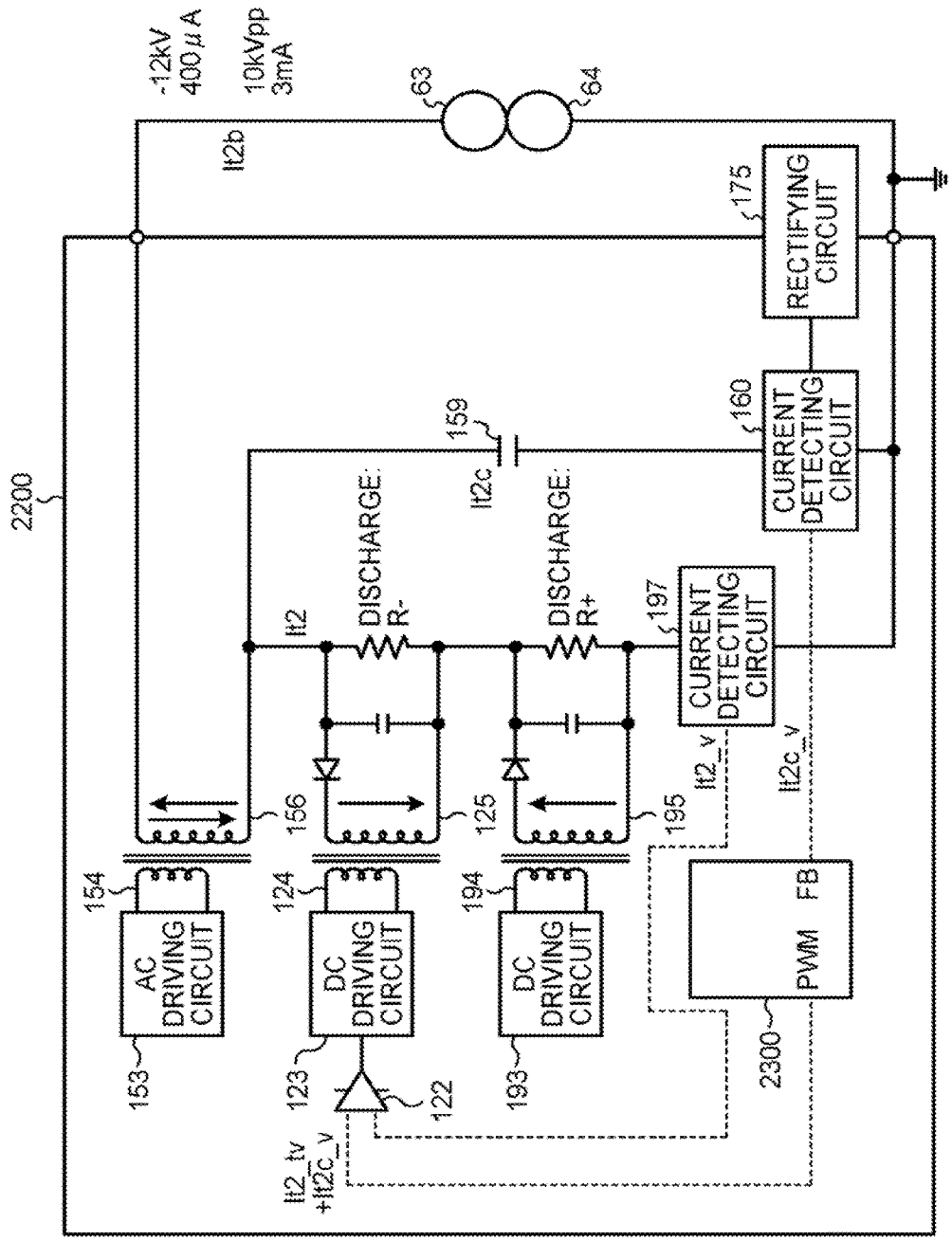
FIG. 18 is a diagram schematically illustrating the secondary transfer power supply and the power supply controlling unit for the purpose of explaining a method for shortening the rising period of a direct-current voltage when the secondary transfer power supply according to the second modification example outputs a superimposed voltage.

FIG. 18 is a diagram schematically illustrating the secondary transfer power supply 2200 and the power supply controlling unit 2300 for the purpose of explaining a method for shortening the rising period of a DC voltage when the secondary transfer power supply 2200 according to the second modification example outputs a superimposed voltage.

In this situation, although the power supply controlling unit 2300 is provided on the inside of the secondary transfer power supply 2200, because the operations of the power supply controlling unit 2300 and the secondary transfer power supply 2200 are the same as those in the embodiment described above, detailed explanations thereof will be omitted.

As explained above, also in the situation where the power supply controlling unit is provided on the inside of the secondary transfer power supply, it is possible to achieve advantageous effects that are the same as those in the embodiment described above. In this situation, it is not necessary to configure the entirety of the power supply controlling unit 300 of the embodiment described above into the power supply controlling unit 2300. It is acceptable to provide both the power supply controlling unit 300 and the power supply controlling unit 2300 so that at least only the functions required by the feedback control are executed by the power supply controlling unit 2300.

Third Modification Example

In the first modification example, the example is explained in which the power supply controlling unit is provided on the outside of the secondary transfer power supply; however, it is also acceptable to provide the power supply controlling unit on the inside of the secondary transfer power supply.

Figure 19:
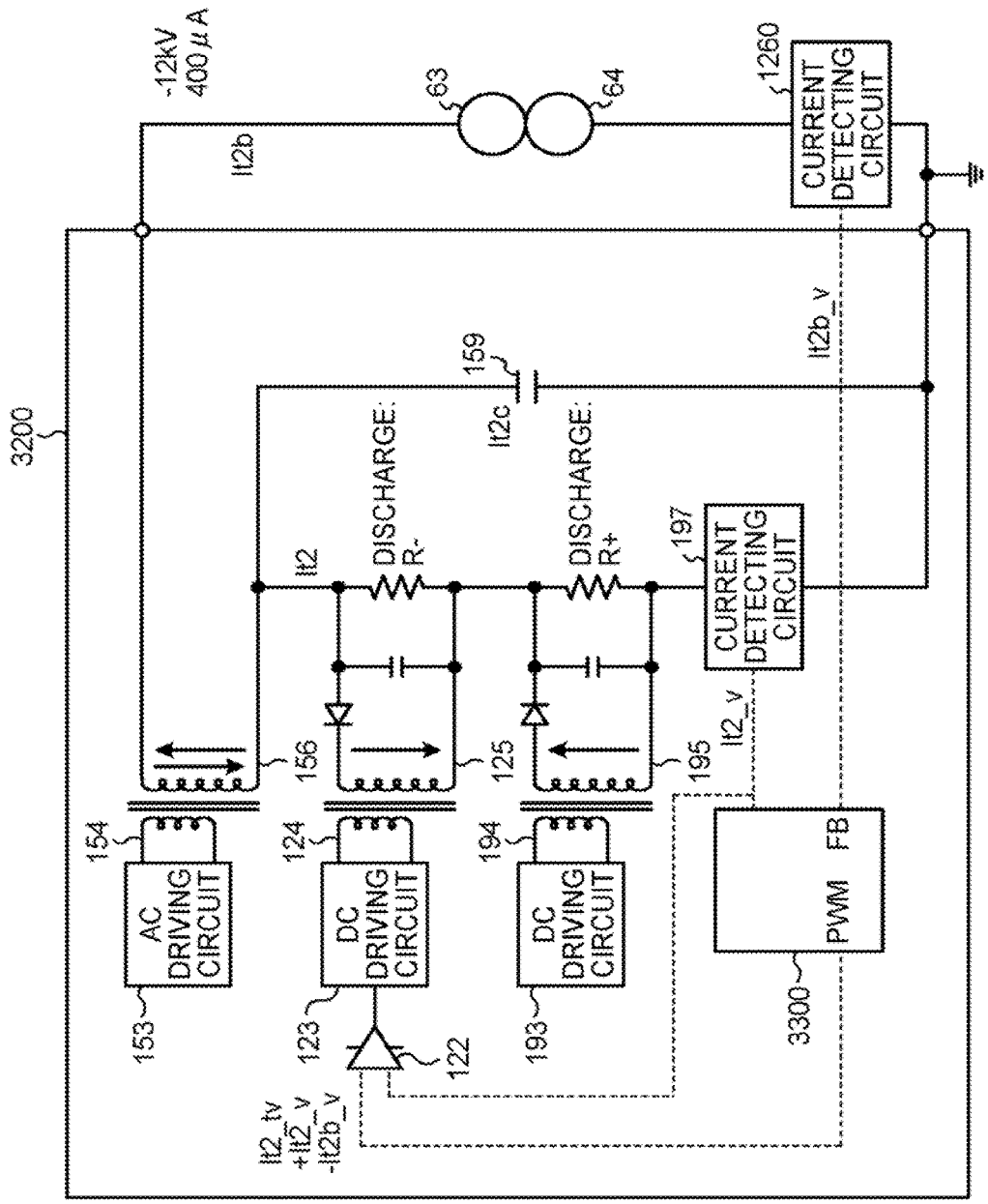
FIG. 19 is a diagram schematically illustrating a secondary transfer power supply and a power supply controlling unit for the purpose of explaining a method for shortening the rising period of a direct-current voltage according to a third modification example of the present embodiment.

FIG. 19 is a diagram schematically illustrating a secondary transfer power supply 3200 and a power supply controlling unit 3300 for the purpose of explaining a method for shortening the rising period of a DC voltage according to a third modification example.

In this situation, although the power supply controlling unit 3300 is provided on the inside of the secondary transfer power supply 3200, because the operations of the power supply controlling unit 3300 and the secondary transfer power supply 3200 are the same as those in the first modification example, detailed explanations thereof will be omitted.

As explained above, also in the situation where the power supply controlling unit is provided on the inside of the secondary transfer power supply, it is possible to achieve advantageous effects that are the same as those in the first modification example. In this situation, it is not necessary to configure the entirety of the power supply controlling unit 1300 of the first modification example described above into the power supply controlling unit 3300. It is acceptable to provide both the power supply controlling unit 1300 and the power supply controlling unit 3300 so that at least only the functions required by the feedback control are executed by the power supply controlling unit 3300.

Fourth Modification Example

In the embodiment described above, the example is explained in which the DC current It2c is detected; however, another arrangement is acceptable in which the DC current It2c is predicted.

Figure 20:
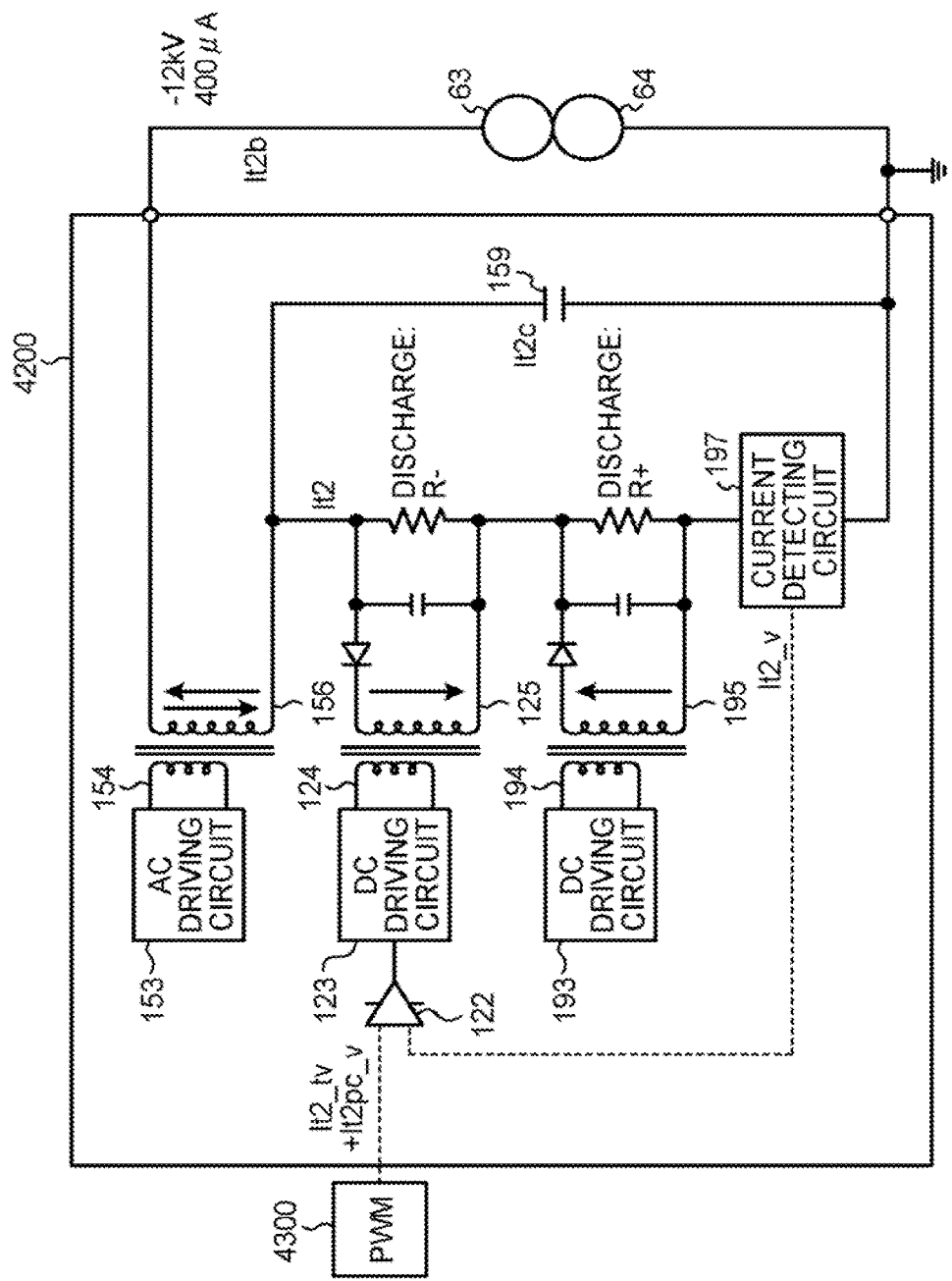
FIG. 20 is a diagram schematically illustrating a secondary transfer power supply and a power supply controlling unit for the purpose of explaining a method for shortening the rising period of a direct-current voltage according to a fourth modification example of the present embodiment.

FIG. 20 is a diagram schematically illustrating a secondary transfer power supply 4200 and a power supply controlling unit 4300 for the purpose of explaining a method for shortening the rising period of a DC voltage according to a fourth modification example.

The power supply controlling unit 4300 predicts the level of the DC current It2c. For example, by using Expression (1), the power supply controlling unit 4300 predicts the level of the DC current It2c.

$$It2pc\_v = (E/R)e^{(-1/CR)t} \quad (1)$$

In Expression (1), It2pc_v denotes a predicted value indicating the predicted level of the DC current It2c. The letter C denotes the capacitance of the AC bypass capacitor 159. The letter R denotes the resistance value at the stage preceding the AC bypass capacitor 159 (a combined resistance on the inside of the secondary transfer power supply 4200). The letter E denotes the voltage applied to the load (the secondary transfer unit opposing roller 63) connected to the secondary transfer power supply 4200. The letter t denotes the time period during which the voltage E is applied to the AC bypass capacitor 159. Because the current flowing to the AC bypass capacitor 159 is at a maximum when t=0 is satisfied, the value of It2pc_v observed immediately after the start of the output is equal to E/R.

Further, the power supply controlling unit 4300 controls the duty of the DC(-)_PWM signal by taking the predicted value It2pc_v into account of the target value It2_tv for the DC current It2 observed after the rising of the DC voltage and further outputs the DC(-)_PWM signal to the current controlling circuit 122. In other words, the power supply controlling unit 4300 causes the DC power supply 110 to control the level of the DC voltage output therefrom, based on the target value It2_tv and the predicted value It2pc_v.

More specifically, the power supply controlling unit 4300 controls the duty of the DC(-)_PWM signal in such a manner that the value (the integrated value of the DC(-)_PWM signal) input to the current controlling circuit 122 is equal to It2_tv+It2pc_v and further outputs the DC(-)_PWM signal to the current controlling circuit 122. In other words, the power supply controlling unit 4300 causes the DC power supply 110 to control the level of the DC voltage output therefrom, in such a manner that the output value It2_v of the DC current It2 is equal to It2_tv+It2pc_v.

As explained above, in the fourth modification example, the control is executed so that the DC current is output from the primary-side coil N1_DC(-) 124 of the DC high-voltage transformer and the secondary-side coil N2_DC(-) 125 of the DC high-voltage transformer, by predicting the DC current corresponding to the amount that flowed to the AC bypass capacitor 159 instead of flowing to the secondary transfer unit opposing roller 63.

Accordingly, in the fourth modification example also, it is possible to achieve the same advantageous effects as those in the embodiment described above. Although the predicted value It2pc_v is calculated by the power supply controlling unit 4300 while using Expression (1) in the fourth modification example, another arrangement is acceptable in which the user is able to freely adjust the predicted value.

As for the situation in which the secondary transfer power supply 4200 outputs a superimposed voltage, because the rising period of the AC voltage output by the AC power supply 140 is shorter than the rising period of the DC voltage output by the DC power supply 110 and because, in the fourth modification example also, the AC voltage is caused to rise after the DC voltage rises, the situation is basically the same as the situation where the secondary transfer power supply 4200 outputs only the DC voltage. Accordingly, also in the situation where the secondary transfer power supply 4200 outputs a superimposed voltage, it is possible to achieve the same advantageous effects as those achieved when the secondary transfer power supply 4200 outputs only the DC voltage.

Fifth Modification Example

In the embodiment described above, the example is explained in which the transfer bias is applied by connecting the secondary transfer power supply 200 for the transfer bias purpose to the secondary transfer unit opposing roller 63. However, it is also possible to transfer, without any problem, the toner image onto a recording medium by applying the transfer bias while the secondary transfer power supply 200 for the transfer bias purpose is connected to the secondary transfer roller 64. Alternatively, for example, it is also possible to transfer, without any problem, the toner image onto a recording medium by connecting one end of the secondary transfer power supply 200 for the transfer bias purpose to the secondary transfer unit opposing roller 63 and connecting the other end thereof to the secondary transfer roller 64. The same applies to any of the first to the fourth modification examples.

Sixth Modification Example

In the embodiment described above, the example is explained in which the secondary transfer power supply 200 is used for the transfer bias; however possible embodiments are not limited to this example. For instance, because a high-voltage output is yielded by using a superimposed bias in order to electrically charge the photoconductor drum 11, it is also acceptable to use the secondary transfer power supply 200 for electrically charging the photoconductor drum 11. The same applies to any of the first to the fifth modification examples.

Seventh Modification Example

In the embodiment described above, the DC(+)_PWM signal (the reverse bias output signal) is output before the transfer process. This procedure is taken for the purpose of arranging the toner to stay on the intermediate transfer belt 60 side before the transfer process. Thus, when a toner removing means such as a belt cleaning process or the like is provided, this procedure may be omitted. The same applies to any of the first to the sixth modification examples.

According to at least one aspect of the present disclosure, an advantageous effect is achieved where it is possible to cause the DC voltage to rise within the expected period of time, while shortening the rising period of the DC voltage.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. A power supply controlling device comprising:
   a direct-current power supply configured to output a direct-current voltage;
   an alternating-current power supply configured to output one selected from between a superimposed voltage obtained by superimposing an alternating-current voltage onto the direct-current voltage and the direct-current voltage;
   a bypass capacitor configured to partially store therein an output from the alternating-current power supply and configured to, when the direct-current voltage is output from the direct-current power supply while no electric charge is stored therein, store therein a second direct current being a part of a first direct current output from the direct-current power supply in conjunction with the output of the direct-current voltage; and
   a power supply controlling unit configured to cause the direct-current power supply to control a level of the direct-current voltage based on a target value for the first direct current and a value indicating the second direct current.

2. The power supply controlling device according to claim 1, further comprising:
   a current detecting unit configured to detect the second direct current and output a detected value as an output value, wherein
   the power supply controlling unit causes the direct-current power supply to control the level of the direct-current voltage based on the target value and the output value.

3. The power supply controlling device according to claim 2, wherein
   the power supply controlling unit causes the direct-current power supply to control the level of the direct-current voltage in such a manner that a value of the first direct current is equal to a sum of the target value and the output value.

4. The power supply controlling device according to claim 1, further comprising:
   a first current detecting unit configured to detect the first direct current and output a detected value as a first output value; and
   a second current detecting unit configured to detect a third direct current being a part of the first direct current and flowing to a load, and configured to output a detected value as a second output value, wherein
   the power supply controlling unit causes the direct-current power supply to control the level of the direct-current voltage based on the target value, the first output value, and the second output value.

5. The power supply controlling device according to claim 4, wherein
   the power supply controlling unit causes the direct-current power supply to control the level of the direct-current voltage in such a manner that the value of the first direct current is equal to a value calculated by subtracting the second output value from a sum of the target value and the first output value.

6. The power supply controlling device according to claim 1, wherein
   the power supply controlling unit predicts a level of the second direct current and causes the direct-current power supply to control the level of the direct-current voltage based on the target value and a predicted value indicating the predicted level of the second direct current.

7. The power supply controlling device according to claim 6, wherein
   the power supply controlling unit causes the direct-current power supply to control the level of the direct-current voltage in such a manner that a value of the first direct current is equal to a sum of the target value and the predicted value.

8. An image forming apparatus comprising:
   the power supply controlling device according to claim 1; and
   a transfer unit configured to transfer an image onto a recording medium based on an output from the alternating-current power supply.

9. A power supply device comprising:
   a direct-current power supply configured to output a direct-current voltage;
   an alternating-current power supply configured to output one selected from between a superimposed voltage obtained by superimposing an alternating-current voltage onto the direct-current voltage and the direct-current voltage;
   a bypass capacitor configured to partially store therein an output from the alternating-current power supply and configured to, when the direct-current voltage is output from the direct-current power supply while no electric charge is stored therein, store therein a second direct current being a part of a first direct current output from the direct-current power supply in conjunction with the output of the direct-current voltage; and a power supply controlling unit configured to cause the direct-current power supply to control a level of the direct-current voltage based on a target value for the first direct current and a value indicating the second direct current.

10. The power supply device according to claim 9, further comprising:

a current detecting unit configured to detect the second direct current and output a detected value as an output value, wherein the power supply controlling unit causes the direct-current power supply to control the level of the direct-current voltage based on the target value and the output value.

11. The power supply device according to claim 10, wherein the power supply controlling unit causes the direct-current power supply to control the level of the direct-current voltage in such a manner that a value of the first direct current is equal to a sum of the target value and the output value.

12. The power supply device according to claim 9, further comprising:

a first current detecting unit configured to detect the first direct current and output a detected value as a first output value; and a second current detecting unit configured to detect a third direct current being a part of the first direct current and flowing to a load, and configured to output a detected value as a second output value, wherein the power supply controlling unit causes the direct-current power supply to control the level of the direct-current voltage based on the target value, the first output value, and the second output value.

13. The power supply device according to claim 12, wherein the power supply controlling unit causes the direct-current power supply to control the level of the direct-current voltage in such a manner that the value of the first direct current is equal to a value calculated by subtracting the second output value from a sum of the target value and the first output value.

14. An image forming apparatus comprising:

the power supply device according to claim 9; and a transfer unit configured to transfer an image onto a recording medium based on an output from the alternating-current power supply.

15. A power supply controlling method comprising:

a first outputting to output a direct-current voltage;

a second outputting to output one selected from between a superimposed voltage obtained by superimposing an alternating-current voltage onto the direct-current voltage and the direct-current voltage; and a controlling to have a level of the direct-current voltage controlled based on a target value for a first direct current that is output in conjunction with the output of the direct-current voltage and a value indicating a second direct current that is a part of the first direct current and is stored in a bypass capacitor.

* * * * *